US010506838B2

(12) United States Patent
Tammam et al.

(10) Patent No.: US 10,506,838 B2
(45) Date of Patent: Dec. 17, 2019

(54) AUGMENTED AUDIO ENHANCED PERCEPTION SYSTEM

(71) Applicants: Eric S. Tammam, Modiin (IL); Benedetto Tammam, Brooklyn, NY (US)

(72) Inventors: Eric S. Tammam, Modiin (IL); Benedetto Tammam, Brooklyn, NY (US)

( * ) Notice: Subject to any disclaimer, the term of this patent is extended or adjusted under 35 U.S.C. 154(b) by 168 days.

(21) Appl. No.: 15/531,563

(22) PCT Filed: Nov. 30, 2015

(86) PCT No.: PCT/US2015/062898
§ 371 (c)(1),
(2) Date: May 30, 2017

(87) PCT Pub. No.: WO2016/086230
PCT Pub. Date: Jun. 2, 2016

(65) Prior Publication Data
US 2017/0354196 A1 Dec. 14, 2017

Related U.S. Application Data

(60) Provisional application No. 62/085,465, filed on Nov. 28, 2014.

(51) Int. Cl.
*A42B 3/04* (2006.01)
*B60Q 9/00* (2006.01)
(Continued)

(52) U.S. Cl.
CPC .............. *A42B 3/046* (2013.01); *B60Q 9/008* (2013.01); *G08G 1/163* (2013.01); *G08G 1/166* (2013.01);
(Continued)

(58) Field of Classification Search
CPC ..... A42B 3/046; A42B 3/0433; A42B 3/0303; B60Q 9/00; B60Q 9/008; G08G 1/163;
(Continued)

(56) References Cited

U.S. PATENT DOCUMENTS 5,914,661 A * 6/1999 Gross ..................... A42B 3/046
250/206.2
2002/0144418 A1 10/2002 Endo et al.
(Continued)

FOREIGN PATENT DOCUMENTS

WO 2014/124126 A1 8/2014

OTHER PUBLICATIONS

Young, Lee W.; PCT/US2015/062898; International Search Report and Written Opinion; ISA/US; dated Feb. 12, 2016.

*Primary Examiner* — Marthe Y Marc-Coleman
(74) *Attorney, Agent, or Firm* — Nexsen Pruet, LLC; Todd A. Serbin

(57) ABSTRACT

A method of using an augmented audio enhanced perception system, comprising: tracking at least one object with at least one helmet mounted sensing unit; processing at least one of the at least one tracked object and an ambient sound by a processing unit; and, providing at least one of a synthesized audio signal and a processed ambient sound to a first user of the system using an audio interface unit, to provide information concerning the at least one object to the first user.

22 Claims, 18 Drawing Sheets

(51) Int. Cl.
    *A42B 3/30*     (2006.01)
    *G08G 1/16*     (2006.01)
    *H04S 3/00*     (2006.01)
    *H04R 5/033*     (2006.01)
    *H04R 1/10*     (2006.01)

(52) U.S. Cl.
    CPC ............. *G08G 1/167* (2013.01); *H04R 5/033* (2013.01); *H04R 1/1041* (2013.01); *H04R 1/1083* (2013.01); *H04R 2460/13* (2013.01); *H04R 2499/13* (2013.01)

(58) Field of Classification Search
    CPC ........ G08G 1/166; G08G 1/167; H04R 5/033; H04R 1/1041; H04R 1/1083; H04R 2460/13; H04R 2499/13; H04S 3/00
    USPC ................... 701/301; 345/8, 633; 250/206.2
    See application file for complete search history.

(56) References Cited

U.S. PATENT DOCUMENTS

| | | | |
|---|---|---|---|
| 2004/0111271 A1 | 6/2004 | Tischer | |
| 2004/0226079 A1* | 11/2004 | Rainey | A42B 3/30 |
| | | | 2/422 |
| 2012/0176268 A1 | 7/2012 | Aker | |
| 2014/0039354 A1 | 2/2014 | Greenwald et al. | |
| 2015/0338659 A1* | 11/2015 | Gallery | A42B 3/042 |
| | | | 345/8 |
| 2016/0209648 A1* | 7/2016 | Haddick | G02B 27/0093 |

* cited by examiner

AUGMENTED AUDIO ENHANCED PERCEPTION SYSTEM

RELATED APPLICATIONS

This application claims priority under Article 8(1) PCT to U.S. Pat. App. No. 62/085,465 filed November 28, 2014, the disclosure of which is incorporated herein by reference.

BACKGROUND

In 2004, 1.2 million people were killed and 50 million injured in automotive collisions. "World report on road traffic injury prevention", World Health Organization. A report issued in 1985 based on data from the US and Great Britain found human factors contributed to 93% of collisions, suggesting that improving driver performance will significantly reduce the rate of collisions in those countries. Harry Lum & Jerry A. Reagan, "Interactive Highway Safety Design Model: Accident Predictive Module", *Public Roads Magazine* (Winter 1995). Previous attempts have been made to enhance safety, for example US 20130311075, U.S. Pat. No. 7,015,812, U.S. Pat. No. 5,979,586, U.S. Pat. No. 5,339,075, U.S. Pat. No. 4,694,296, U.S. Pat. No. 4,528,563, and U.S. Pat. No. 3,321,737, the contents of all of which are incorporated herein by reference.

SUMMARY OF THE INVENTION

Improved driver performance can be achieved by assisting the driver's environmental perception by providing the driver with intuitive, non-distracting, real time information pertaining to the surrounding environment. Due to the overload of visual sensory input experienced by a vehicle operator while driving, a means of transmitting the information via audible signals is provided, in some embodiments of the invention. In some embodiments of the invention, a system to provide spatially resolved audio information (spatial hearing) to a vehicle operator for the purpose of improving the operator's environmental perception and/or road awareness is provided. The system comprises at least one of a sensing unit, a processing unit and/or an audio interface unit. Data acquired by the sensing unit may include information on the current position of other vehicles in the vicinity of the vehicle operator and the dynamics of those vehicles with respect to the sensing unit (distance, relative velocity, acceleration, etc . . . ). The sensory information is then transferred to the processing unit to construct a digital representation of the area in the vicinity of the vehicle. The processing unit will relay information based on a predefined set of rules to the operator via a surround sound audio system. The audio representation provides the operator with spatially resolved audio information on the positions and dynamics of other vehicles in the vicinity of the operator.

There is provided in accordance with an exemplary embodiment of the invention, a method of using an augmented audio enhanced perception system, comprising: tracking at least one object with at least one helmet mounted sensing unit; processing at least one of the at least one tracked object and an ambient sound by a processing unit; and, providing at least one of a synthesized audio signal and a processed ambient sound to a first user of the system using an audio interface unit, to provide information concerning the at least one object to the first user.

In an embodiment of the invention, the at least one synthesized audio signal and the ambient sound are subdivided into individual, customizable, selectable tracks.

In an embodiment of the invention, the processing includes at least one of decreasing, amplifying, and clarifying.

In an embodiment of the invention, the method further comprises constantly updating the synthesized audio signal in real time based on the tracking.

In an embodiment of the invention, the information includes at least one of position, acceleration, distance, size, speed, orientation, direction, relative position, relative acceleration, relative distance, relative size, relative speed, relative orientation and relative direction.

In an embodiment of the invention, the tracking is conducted using at least one of optical camera, omnidirectional camera, ultrasound, laser, time of flight cameras, light field cameras, stereoscopic vision, interferometry and radar.

In an embodiment of the invention, the method further comprises dynamically changing at least one of tracking, processing and providing based on at least one of detected user global position cross-referenced with a map and user field of view.

In an embodiment of the invention, the method further comprises alerting the at least one object using at least one of an audio signal and light.

In an embodiment of the invention, the method further comprises communicating with a second user's audio collision warning system to enhance at least one of the tracking, processing and providing for at least the first user.

In an embodiment of the invention, the second user's augmented audio enhanced perception system provides tracking in a blind spot of the first user's audio collision warning system.

In an embodiment of the invention, the method further comprises at least one of calibrating the at least one sensor and detecting orientation of the first or a second user's helmet using a specific pattern or reflector for orienting the system with the vehicle.

In an embodiment of the invention, the method further comprises providing directional notification to at least one oncoming vehicle tracked by the at least one sensing unit, using an extra vehicular notification unit.

In an embodiment of the invention, the directional notification comprises at least one of an audio signal and light.

In an embodiment of the invention, the method further comprises configuring the extra vehicular notification unit with a plurality of different situational operative modes.

In an embodiment of the invention, the configuring includes providing at least one rule of operation based on at least one of GPS information, velocity, trajectory relative to the at least one tracked object, and traffic information acquired through a global communications network.

In an embodiment of the invention, the processing further comprises using Doppler radar to differentiate between at least one moving object and background signals.

In an embodiment of the invention, the sensing unit and the helmet are in a fixed orientation with respect to each other, thereby maintaining a constant known orientation for providing feedback to the first user.

In an embodiment of the invention, the at least part of the tracking comprises sensing from at least one sensing unit mounted on a vehicle.

In an embodiment of the invention, the method further comprises detecting the orientation of the helmet of the first user and providing the at least one of a synthesized audio signal and a processed ambient sound based on the orientation.

There is further provided in accordance with an exemplary embodiment of the invention, an audio collision warning system, comprising: at least one helmet-mounted sensing unit configured to track at least one object; at least one processing unit configured to process at least one of the at least one tracked object and an ambient sound; and, at least one audio interface unit configured to provide at least one of a synthesized audio signal and a processed ambient sound to a first user of the system to provide information concerning the at least one object to the first user.

In an embodiment of the invention, the at least one sensing unit comprises at least one of an ultrasound device, a laser range finder, a time of flight camera, a light field camera, stereoscopic vision, an interferometry device and a radar device.

In an embodiment of the invention, the at least one sensing unit is in the form of a ribbon.

In an embodiment of the invention, the system further comprises at least one sensing unit mounted on a second user's helmet.

In an embodiment of the invention, the system further comprises at least one vehicle mounted sensing unit.

In an embodiment of the invention, the system further comprises a communications channel.

In an embodiment of the invention, the at least one sensing unit is configured to track a plurality of objects in more than one direction and distance relative to a user of the system.

In an embodiment of the invention, the at least one audio interface unit is configured to provide sound to a user which indicates information about at least one object sensed by the sensing unit.

In an embodiment of the invention, the helmet-mounted sensing unit is configured to detect the orientation of the helmet mounted sensor.

In an embodiment of the invention, the at least one processing unit provides at least one audio signal to the operator based on the detected orientation of the operator's head.

In an embodiment of the invention, the system further comprises an extra vehicular notification unit configured to provide directional notification to at least one other vehicle tracked by the at least one sensing unit.

In an embodiment of the invention, the directional notification is at least one of an audio signal and a light.

In an embodiment of the invention, the extra vehicular notification unit is configured with at least one rule of operation based on at least one of GPS information, velocity, trajectory relative to the at least one tracked object, and traffic information acquired through a global communications network.

BRIEF DESCRIPTION OF THE FIGURES

Some embodiments of the invention are herein described, by way of example only, with reference to the accompanying drawings. With specific reference now to the drawings in detail, it is stressed that the particulars shown are by way of example, are not necessarily to scale, and are for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

Exemplary embodiments of a system configured to provide spatially resolved audio information to a vehicle operator are described. In some embodiments of the invention, audio information includes ambient sound or sounds. In some embodiments of the invention, audio information includes at least one warning signal. In some embodiments of the invention, at least some ambient sound and at least one warning signal are provided by the system to the user. Optionally, the at least one ambient sound and/or at least one warning signal is enhanced and/or processed to enhance user environmental awareness and/or safety.

Figure 1:
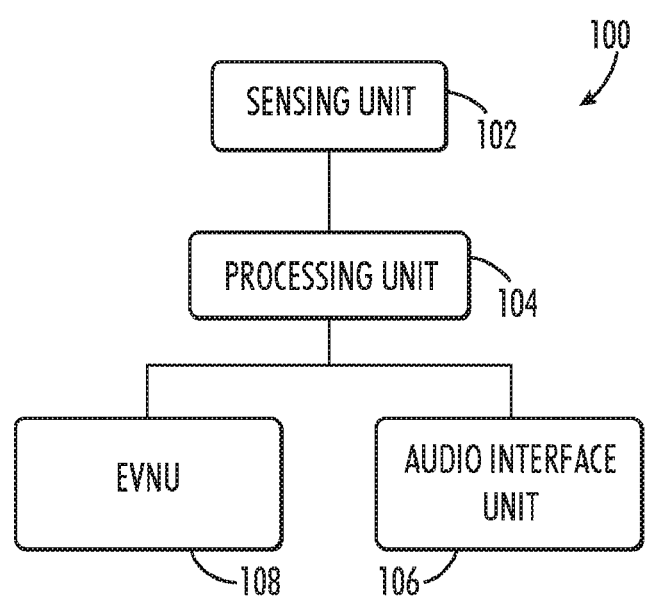
FIG. 1 is a schematic of an audio enhanced perception system, in accordance with an exemplary embodiment of the invention.

The system 100 optionally comprises at least a sensing unit 102, a processing unit 104 and/or an audio interface unit 106 and/or an extra-vehicle notification unit (EVNU), as shown in the schematic of FIG. 1. Data acquired by the sensing unit 102 may include information on the current position of other vehicles in the vicinity of the vehicle operator and the dynamics of those vehicles with respect to the sensing unit (distance, relative velocity, acceleration, etc . . . ). The sensory information is then transferred to the processing unit 104 to construct a digital representation of the area in the vicinity of the vehicle. The processing unit 104 will relay information based on a predefined set of rules to the operator via a surround sound capable audio system 106. In some embodiments of the invention, the audio representation provides the operator with spatially resolved audio information on the positions and dynamics of other vehicles in the vicinity of the operator in order to create an "audio scene" for the user/operator of the system 100.

Figure 2:
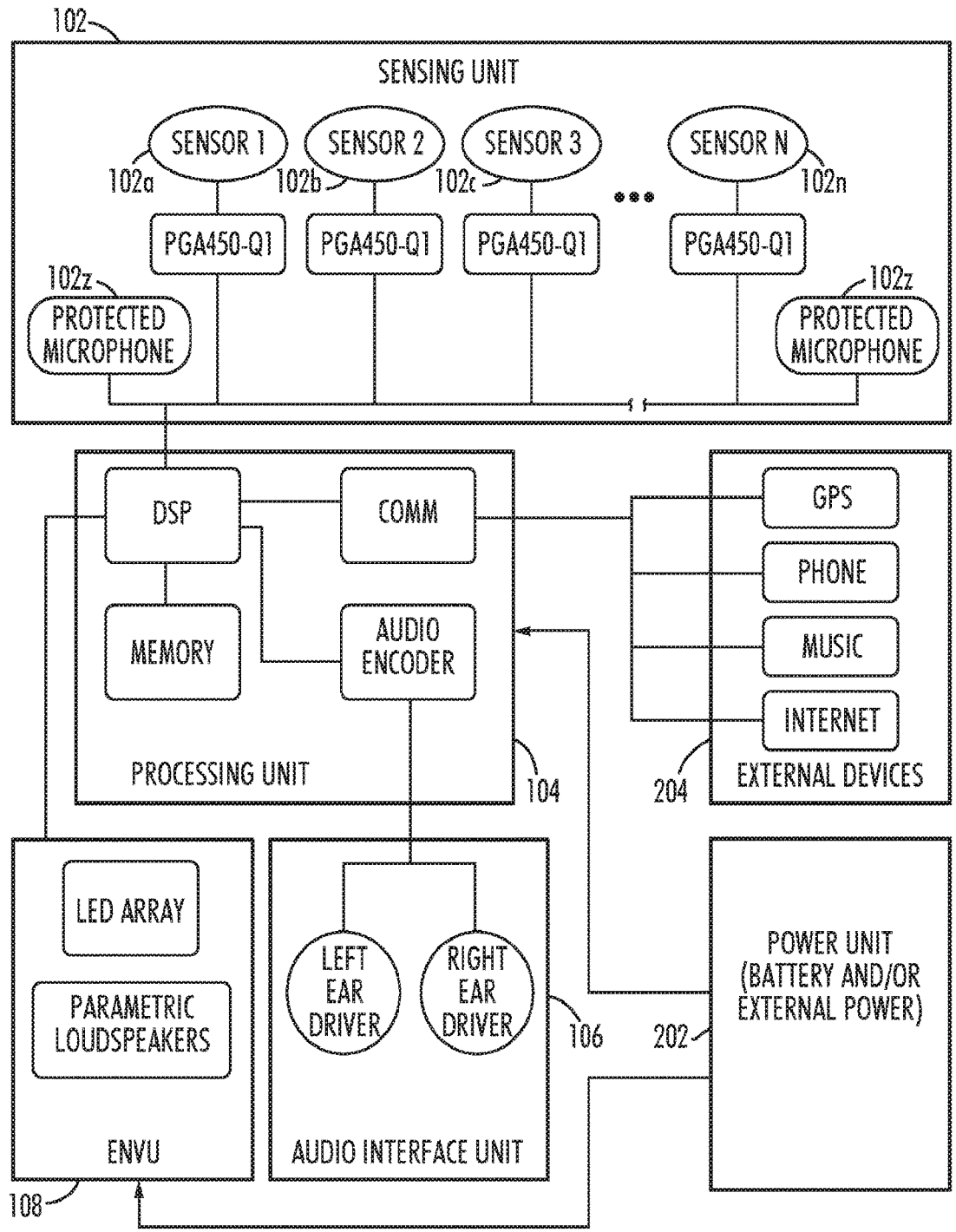
FIG. 2 is a detailed schematic of an audio enhanced perception system, in accordance with an exemplary embodiment of the invention.
Figure 5:
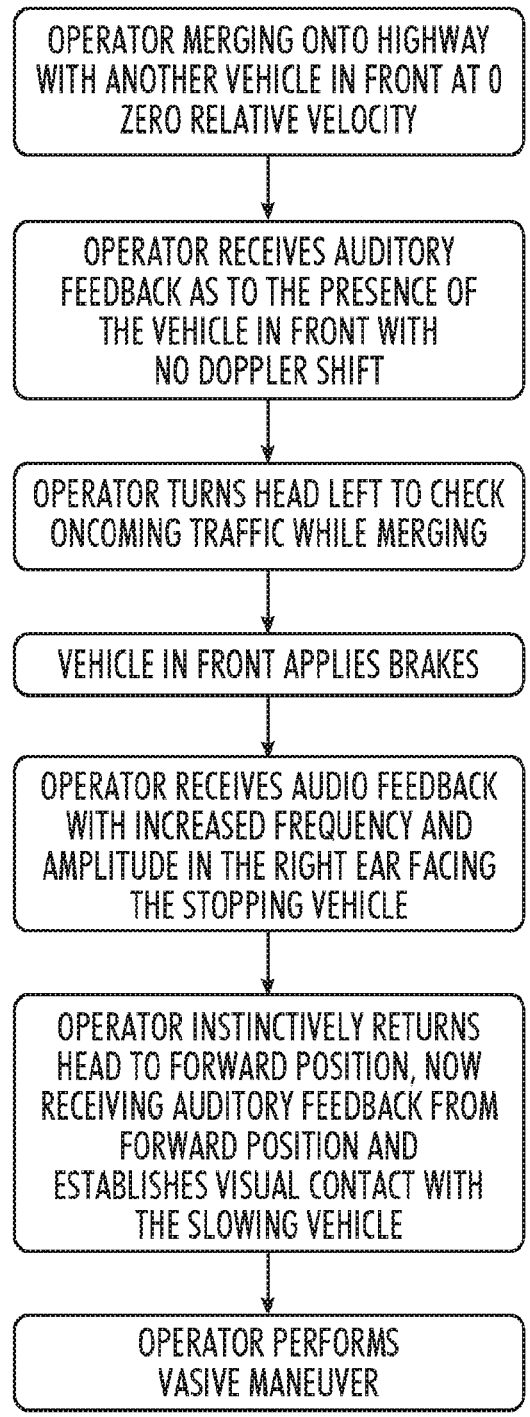
FIG. 5 is a flowchart of a method of using an audio enhanced perception system, in accordance with an exemplary embodiment of the invention.

In some embodiments of the invention, this audio scene is updated and/or presented to the user in real time, optionally continuously or constantly. Optionally, sensed signals and/or system output are at least temporarily stored in a database (not shown). FIG. 2 shows a detailed schematic of an audio enhanced perception system 100, in accordance with an exemplary embodiment of the invention. FIG. 5 is a flowchart of a method of using an audio enhanced perception system 100, in accordance with an exemplary embodiment of the invention.

Exemplary System Description

The following section will provide further details of exemplary components (sensory, processing and audio interface units) comprising the system and their functionality. The entire system 100 could be powered by an on-board power source (i.e. battery) and/or connected to an external power source (power sources 202, shown in FIG. 2) via cable depending on the application and in some cases, user preference.

Exemplary Sensing Unit (SU)

The sensing unit 102 provides a system input interface between the system 100 and the external environment. The sensing unit 102 is configured to provide data/information relating to other vehicles and/or obstacles with respect to the sensory unit 102, for example, the position, velocity, trajectory and/or acceleration thereof. The sensing unit 102 may employ any number of sensing technologies or a combination thereof. The technology chosen would largely depend on the particular requirements of the specific application. An example of one such technology may be a laser range finder (such as the Hokuyo UXM-30LX-EW, Lightware SF02) that can provide excellent spatial coverage and resolution of the surrounding area. The temporal resolution should be high enough to allow for the user to receive the information and respond to it in a timely manner. Additional applicable technologies include optical cameras, omnidirectional cameras, time of flight cameras, light field cameras, stereoscopic vision, interferometry, Doppler radar, etc . . . These sensors (102a, 102b, 102c . . . 102n) may be mounted statically or on a moving platform to provide full coverage of the required field of view ("FOV").

In an embodiment of the invention, the sensing unit 102 is an array of long range, narrow beam, ultrasonic ranging (SONAR) sensors (such as Hexamite HX25TR). This technology has numerous advantages for most applications: 1) Inexpensive sensor and supporting electronics, 2) low-power operation, 3) sufficient sensitivity, 4) inherent information on scene dynamics thereby reducing the need for complex calculations on time dependent signals. It should be understood that any other sensing unit could be chosen depending on system application and/or desired performance characteristics. In an embodiment of the invention, the selected device has an angular beam dispersion that would allow for exploitation of human spatial hearing capabilities while ensuring the detection of vehicles in the vicinity of the system. The sensors could be used individually, with each sensor covering a certain area of the FOV and oriented in a contiguous manner so as to provide uninterrupted coverage of the FOV. Alternatively, the sensors can be designed to be operated in tandem as a phased array to scan the FOV by manipulating the phases of the signal from each sensor thereby steering the acoustic beam (such as described in *Shin*, et al., "Nondestructive Testing of Fusion Joints of Polyethylene Piping by Real Time Ultrasonic Imaging", the disclosure of which is incorporated herein by reference). In some embodiments of the invention, a phased array is used, for example in situations where there is a small area for mounting of the transducer array and/or when it is easier to implement in lower frequency applications such as those described herein. Alternatively, the sensing unit 102 can be comprised of separate ultrasonic projectors and receivers that can be configured and/or operated in tandem. In an embodiment of the invention, the sensing may optionally employ frequency modulation sweep techniques to allow for higher temporal resolution than time of flight limitations might allow to avoiding echo cluttering.

In an embodiment of the invention, the sensors are operated each by a separate control board that contains the front end electronics, or alternatively one or more sensors will be connected to a single control board, to construct the sensing waveform and detection regime, multiplex between the sensors, acquire and condition the return signal, perform the analog to digital conversion and transfer the data to the processing unit. An exemplary control board could consist of an Application Specific Integrated Circuit (ASIC) such as the IC PW0268 (Pro-wave electronics corp.), PGA-450 (TI) or DRV8662 (TI) as the central component. Most of the electronics will be included on chip requiring little additional electronics, in an embodiment of the invention. The control board will interface the processing unit 104 for configurability of the ranging regime (distance, measurement frequency, etc . . . ) and/or for further processing of the acquired ranging data.

The sensor unit 102 may also include one or more integrated microphones 102z to provide ambient auditory information to the operator as an audio field backdrop that will be synthesized by the processing unit. The microphones would allow for important audible warnings and/or other environmental sounds to reach the user such as sirens, horns, etc.

Exemplary Processing Unit (PU)

The processing unit 104 receives the signal data from the sensor unit(s) 102 and performs the spatial reconstruction of the surrounding environment optionally based on the analysis of the signal data. Information regarding the proximity, relative and/or absolute speed, size and/or trajectories of surrounding vehicles is optionally extracted from the signal data.

Multiple vehicles and/or other obstacles can be tracked by the system 100 simultaneously, in an embodiment of the invention. The multiple vehicles can be in distinct angular positions or in the same angular position but at different distances. In the case of a multichannel system, vehicles at distinct angular positions are optionally tracked by different sensors. In the case of multiple vehicles in the same angular positions but different distances, the system can optionally differentiate between vehicles by Time of Flight techniques, provided there are no shadowing effects between the sensor and the vehicle.

In an exemplary embodiment of the invention, the use of the deviation (Doppler Shift) of the receive signal frequency from the transmission signal frequency provides information as to the relative speed between the sensor unit 102 and the surrounding objects. The equation below describes how the relative velocity ($V_r$) is related to the shift in the frequency of the acoustic signal ($f_d$) in the case that the vehicle (reflecting object) is.

$$f_d = f_r - f_i = \frac{2f_iV_r}{C}$$

In an embodiment of the invention, since the initial frequency of the ultrasound signal being sent ($f_i$), the frequency of the echo reflected off the object ($f_r$) and the speed of sound in air (C) are known, the equation for relative velocity between the ultrasound source/sensor and the reflecting object can be solved.

$$V_r = \frac{C(f_r - f_i)}{2 f_i}$$

Figure 6:
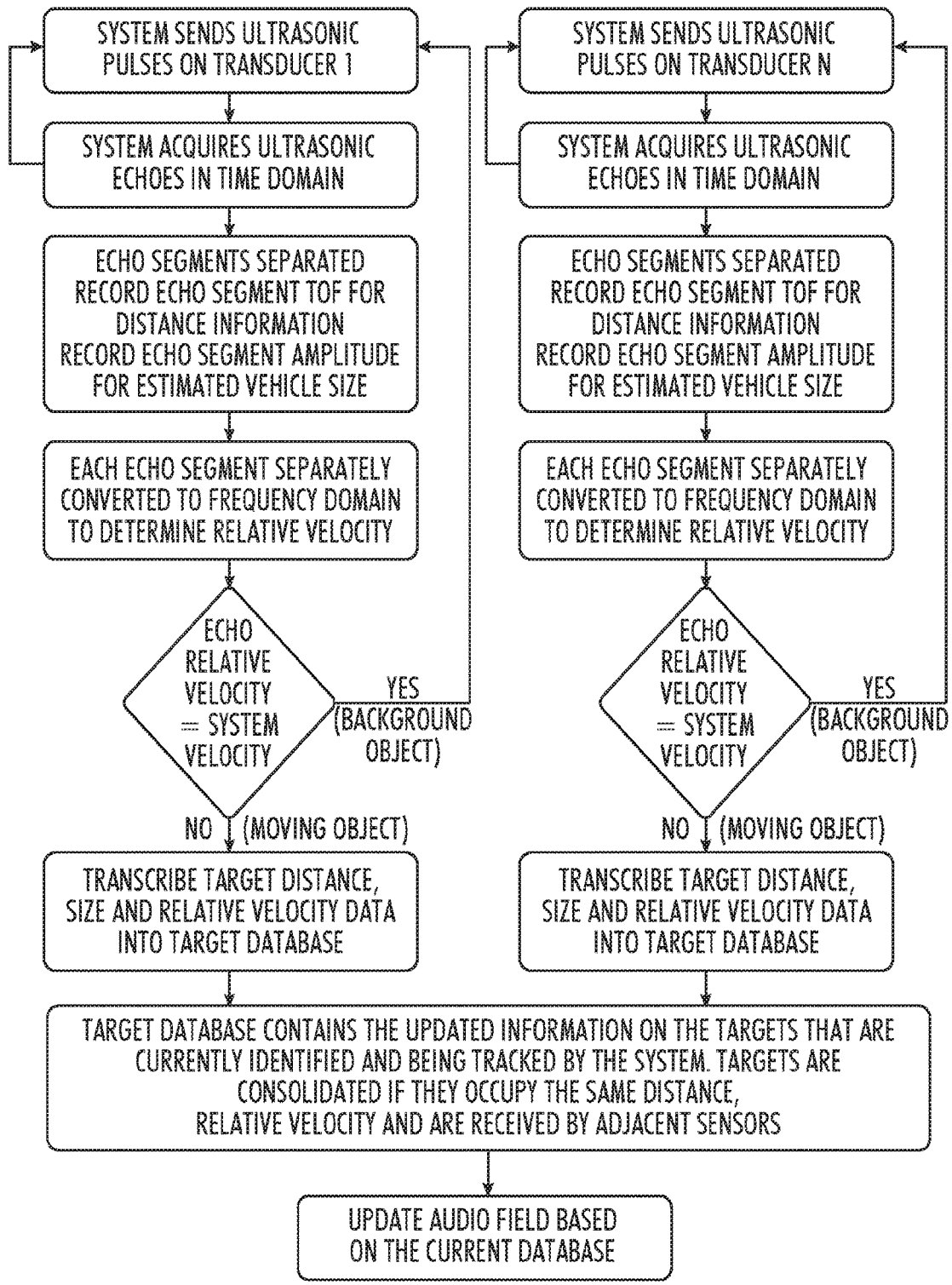
FIG. 6 is a flowchart of a method of tracking multiple objects by a helmet mounted warning system using Doppler shift and echo location, in accordance with an exemplary embodiment of the invention.
Figure 7:
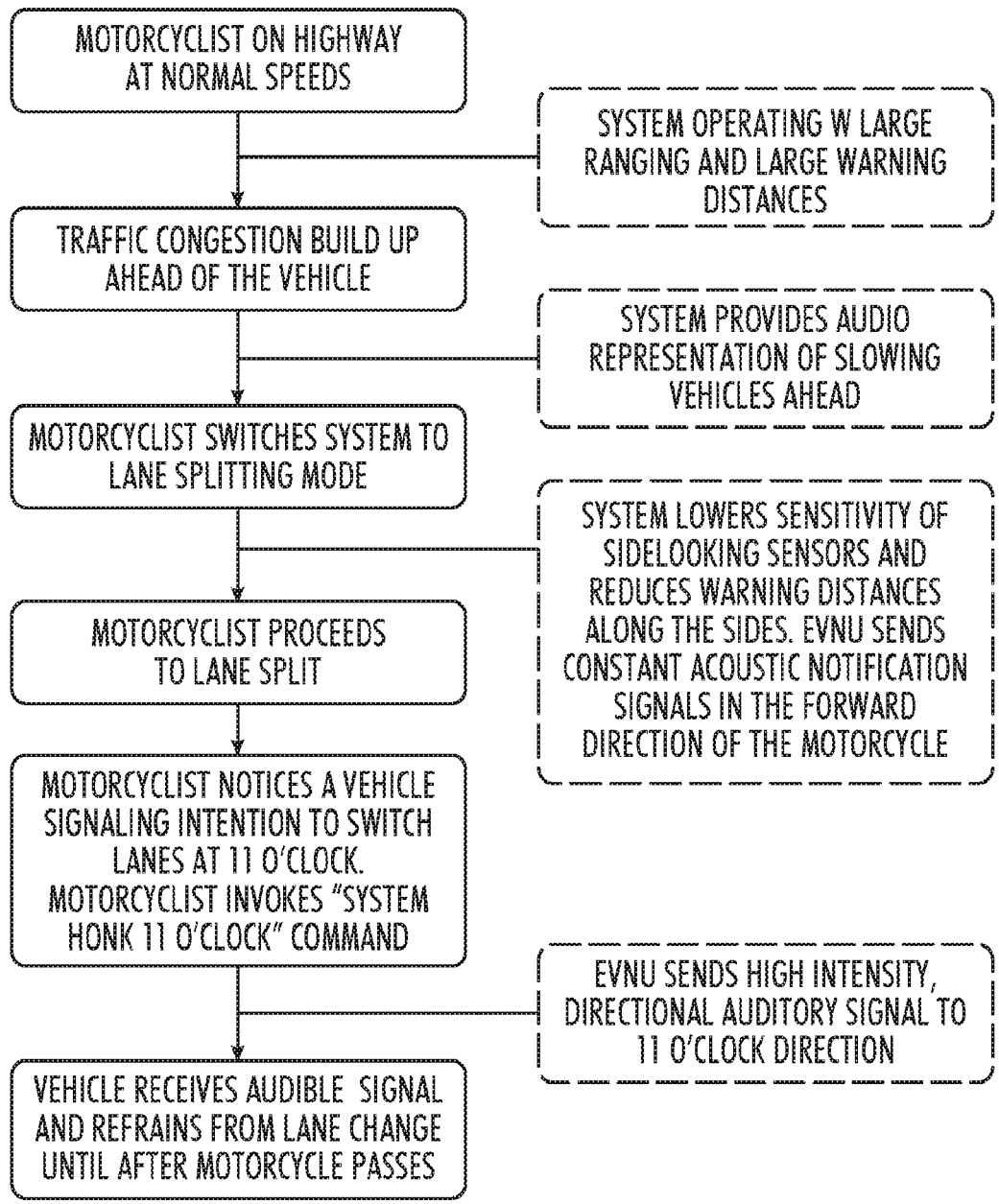
FIG. 7 is a flowchart of a method of dynamically altering the behavior of an audio enhanced perception system, in accordance with an exemplary embodiment of the invention.

This information is optionally used to differentiate between static objects, moving objects that have the same relative velocity and/or moving objects with a different relative velocity, between vehicles and/or other background objects, incoming vs. outgoing vehicles (relative to the sensor) and the calculation of the trajectory of the vehicles to provide only information that may affect the operator's decisions when manipulating the vehicle, optionally by combining the information from multiple sensors. For sensors that are positioned at angles differing from 0 and 180° relative to vehicle direction the Doppler component needs to be multiplied by the cosine of the angle of the sensor field relative to the direction of the mounted vehicle. FIG. 6 is a flowchart of a method of tracking multiple objects by a warning system using Doppler shift and echo location, in accordance with an exemplary embodiment of the invention In an embodiment of the invention, the processing is performed by a dedicated unit 104 located on or off-board the user's helmet or a software application running on an off-board, general processing platform (such as a smartphone, tablet, etc . . . ). The processing unit 104 is optionally connected to the other components of the system 100 via a wired or wireless communications channel (USB, RS232, Wi-Fi, Wifi Direct, Bluetooth, etc . . . ) to acquire and transmit data. In an embodiment of the invention, optional user settings such as maximum distance, FOV settings, vehicle direction (approaching only or all vehicles), audio representations of the data, etc . . . are used as input into the processing unit as rules for representation of the sensory data to the user. The user can connect to the system 100 using a computer or other device and/or via a wired or wireless communications channel (USB, RS232, Wi-Fi, Bluetooth, etc . . . ) to transmit the settings to the system 100. The user can define modes for operation based upon different driving settings such as country road (threats coming from oncoming adjacent lanes and from the rear with less from the sides), lane splitting (for motorcycles, allowing for close proximity on the sides of the vehicle without tripping a distance alarm), highway (no oncoming traffic, vehicles should be tracked in all directions), etc. Optionally, the system 100 automatically switches and/or changes and/or switches modes of operation. FIG. 7 is a flowchart of a method of dynamically altering the behavior of an audio enhanced perception system 100, in accordance with an exemplary embodiment of the invention. In an embodiment of the invention, the system 100 is connected to a global communications network such as the Internet. Optionally, the system 100 is connected while being used on the road.

The system 100 may be connected to and/or contain a partial or comprehensive navigation system (for example shown as GPS, an "external device" 204). This would allow for verification of vehicle velocity and tailoring system behavior for a particular traffic situation and/or road topology. Such tailored behavior may consist of increasing the range and sensitivity of the "side looking" sensors when entering an intersection, where the "side looking" sensors are optionally limited in a highway situation or increasing sensitivity of the "rear looking" sensors when slowing the vehicle on a highway. Such dynamic behavior would improve the system's "false alarm" rate while improving the power efficiency of the system 100 and providing the user with navigational data via the audio channels.

In an embodiment of the invention, the PU 104 will perform collision probability calculations based on the available data. The relative velocity, absolute velocity, trajectory, distance, road topology (distance) etc. can all be exploited to provide a probability of collision with surrounding objects. The calculated probability of collision may also be affected by the current mode of operation. In the event of a high probability for a collision, the system mounted vehicle operator will be notified with a spatially defined synthetic audio overlay signal. In addition, the PU 104 may activate the EVNU 108 to specifically notify the operator of the opposing vehicle as to the probability of a collision.

The system 100 may be used in conjunction with at least one other audio input such as music, telephone calls, etc . . . or alternatively, additionally and/or optionally the user may choose to amplify the ambient sounds with optional filtering to remove unwanted components such as engine noise, wind noise, etc . . . In the case of additional selected audio inputs, the processing unit 104 will either augment the audio alert signal onto the other audio inputs or alternatively silence the other inputs to provide the alert information.

Exemplary Audio Interface Unit (AIU)

Different audio transmission techniques are optionally employed by an audio interface unit 106 to create the virtual acoustic display to transmit the constructed scene from the sensory 102 and processing units 104 to the user. In an embodiment of the invention, a selected technique provides sufficient spatial resolution to accurately represent the scene to the user and a different technique maybe selected for different applications depending on the infrastructure available for audio transmission and the position of the user relative to that infrastructure. Examples of such techniques include multichannel systems, surround configured stereo headphones, bone conduction head phones, and/or crosstalk cancellation speakers. Each technique has a set of benefits and drawbacks that should be taken into consideration when selecting for a particular application but all the above techniques can provide accurate spatial resolution and the capability of representing a number of enhanced perception events simultaneously.

An example of an application specific technique is the implementation of the audio transmission system in a motorcycle helmet. Due to high ambient noise and a predefined enclosure, it would be feasible and beneficial to implement the audio transmission system over surround sound headphones or audio earplugs that are incorporated into the motorcycle helmet. This would allow for isolation of the ambient noise (which may be provided as an underlay in the augmented audio transmission) and the use of inexpensive surround sound implementation over a set of stereo headphones. In this case, the processor unit 104 will modify the phase and amplitude of the audio signal to each ear to simulate the arrival of sound waves from a particular direction in space. Alternatively, additionally and/or optionally in another embodiment, it would be possible to implement a multichannel system over the headphones, if needed. The audio system 106 would allow the user to select audio inputs that would be used in conjunction with the augmented audio alarm system including filtered ambient input (user can select filtering of wind and/or engine noise), music, navigation, and/or phone call. The additional communication channels to the system can be established by Bluetooth, WiFi Direct, WiFi, USB, audio jack or other means. A microphone can be optionally implemented into the system to allow for audio commands to the system (increase/decrease alarm, ambient, music volume, filtration settings, etc . . . ), conducting phone conversations, and/or inter-rider communication (e.g. passenger, other riders with the system installed).

Certain audio commands to the system may be based on a clockwise coordinate system where the forward looking direction is 12:00. This allows for certain functions to be activated based upon that coordinate system (e.g. "system track at 9 o'clock" will manually instruct the system to track a particular vehicle in the FOV or "system flash at 4" will instruct the system to activate the lighting function on the EVNU unit 108 to alert a particular vehicle currently at that orientation). The user can switch between operating modes of the system by employing audio commands (e.g. "system mode highway" will modify the behavior of the system to the predefined settings for highway. This also provides a means for transmitting the intension of the vehicle operator to surrounding vehicles such as a signaling function ("system turn left" will activate the lighting function on the EVNU 108 to indicate the vehicles intension to turn left to both forward and rear facing vehicles).

Exemplary Extra-Vehicle Notification Unit (EVNU)

In some embodiments of the invention, the system 100 could be integrated with extra-vehicle notification capabilities that would provide information to vehicles in the surrounding area that they are being tracked and/or warned by the system. The EVNU unit 108 (shown in FIGS. 1 and 2) may be mounted on the vehicle or on a helmet, the communication between the PU 104 and EVNU 108 can be performed via a wireless communication channel or cable. In one embodiment, the notification may be in the form of visual feedback where a lighting system is integrated into the sensing unit and will illuminate the direction from which the vehicle has been detected approaching the system. Optionally, the visual feedback is focused, for example on a single oncoming vehicle. This provides the surrounding vehicles with feedback that their presence has been passed onto the operator of the system mounted vehicle.

For audio feedback, it is possible to implement a directional and/or focused audible horn/signal. The audible horn can be an entirely separate unit that is interfaced with the processing unit 104 and triggered with the directional information of the oncoming vehicle. Such a horn can be implemented using directional audio techniques such as a parametric loudspeaker. Yoneyama, M., Fujimoto, Kawamo, Y., Sasabe, S, "The audio spotlight: An application of nonlinear interaction of sound waves to a new type of loudspeaker design", *J Acoust. Soc. Am.* 1983, 73, 1532-1536; and, Nakashima, Y., Yoshimura, T., Naka, N., Ohya, T., "Prototype of mobile super directional loudspeaker", *NTT DoCoMo Tech. J.* 2006, 8, 25-32; the disclosures of which are incorporated herein by reference.

Alternatively, additionally and/or optionally, in the case of an ultrasonic sensing unit, the parametric loudspeaker can be implemented by utilizing the ultrasonic transducers from the sensing unit and operating in tandem generating two or more frequencies with the difference between them (beat frequency) being generated within the overlapping area of their acoustic fields or modulating a lower frequency audio signal over the ultrasound signal to produce the audible signal for notifying the oncoming vehicle.

The EVNU 108 may be instructed to behave differently in different situations depending on the current mode of the system. For example, in "lane splitting" mode the EVNU 108 may give off a constant audible sound in the 10-2 o'clock direction to notify other vehicle operators as to the approaching system mounted vehicle without there being a clear and present danger.

The EVNU 108 is particularly important when installed in vehicles with a low auditory profile (such as electric vehicles). Such vehicles generate little audible noise that allows for other vehicles or pedestrians to perceive the vehicle's location. The EVNU 108 can provide a directional, spatially efficient warning to those vehicles or pedestrians, by first tracking their position and then emitting a notification signal (visual and/or audible) to the vehicle and/or pedestrians. This would provide an effective means of notifying or warning vehicles and/or pedestrians without increasing the environmental noise pollution unnecessarily.

An additional embodiment, would allow for autonomous EVNU operation based on a predefined set of rules. The rules may be based on information acquired by one or more of the following: GPS information for determining vehicle location (highway, urban, etc . . . ), velocity and trajectory relative to traffic, sensory information from the SU 102, traffic information acquired through global network communications channels. An example of autonomous system behavioral modification is of a motorcyclist driving on a highway that encounters sudden traffic congestion. Initially, the system will provide information based on a highway scenario (including appropriate ranges and EVNU responses for that scenario), upon entering congestion the motorcyclist may enter a lane splitting scenario which the system would identify by the close proximity of the adjacent vehicles, the highway location and high relative velocity of the system mounted vehicle. The PU 104 would deduce from those inputs that the system should change to lane splitting mode and begin operating the EVNU 108 accordingly (e.g. a constant audible transmission in the forward direction).

Figure 11:
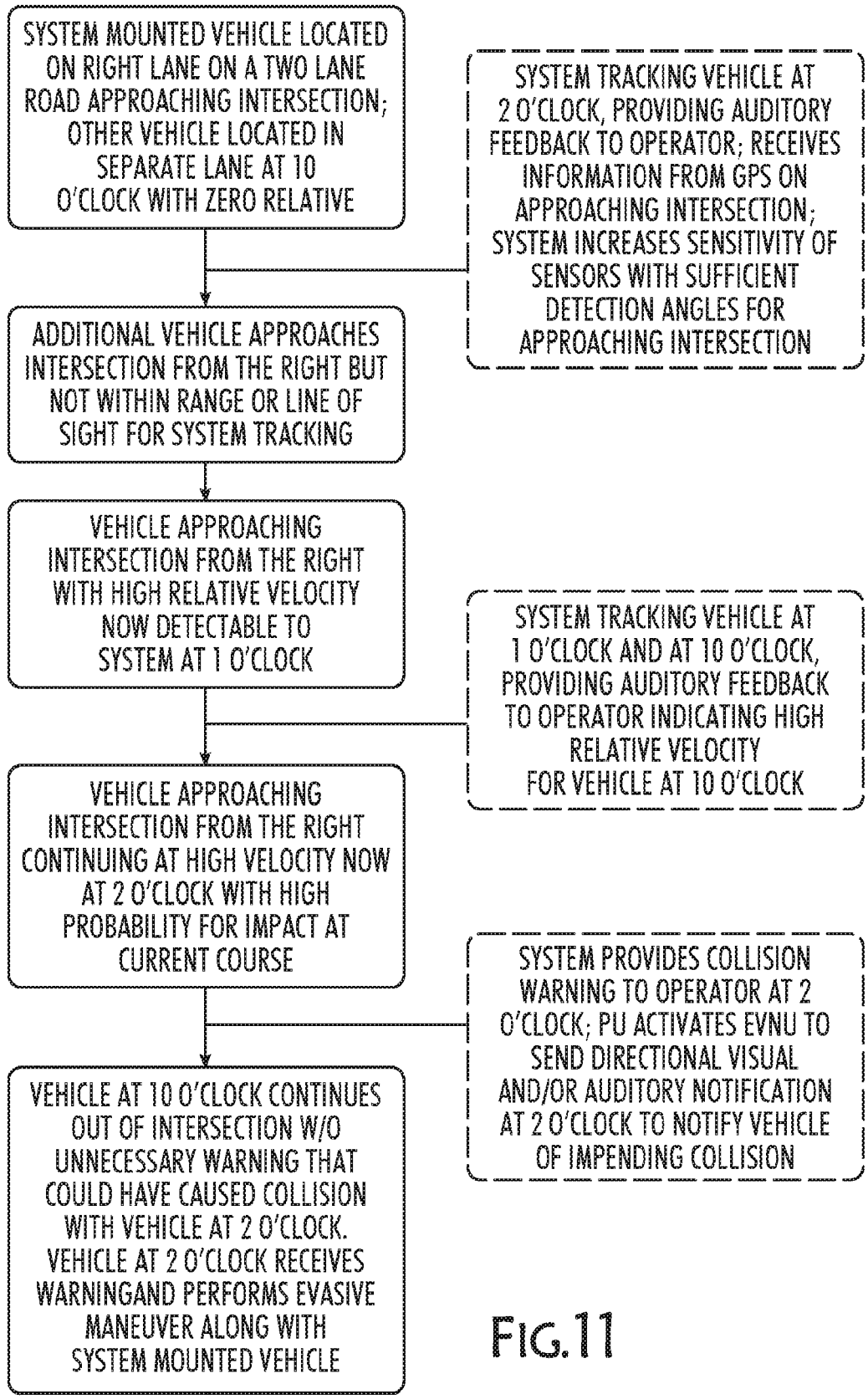

FIG. 11 is a flowchart of a method of notifying at least one other vehicle, in accordance with an exemplary embodiment of the invention.

Exemplary Motorcycle Helmet for Motorcyclists

Figure 3:
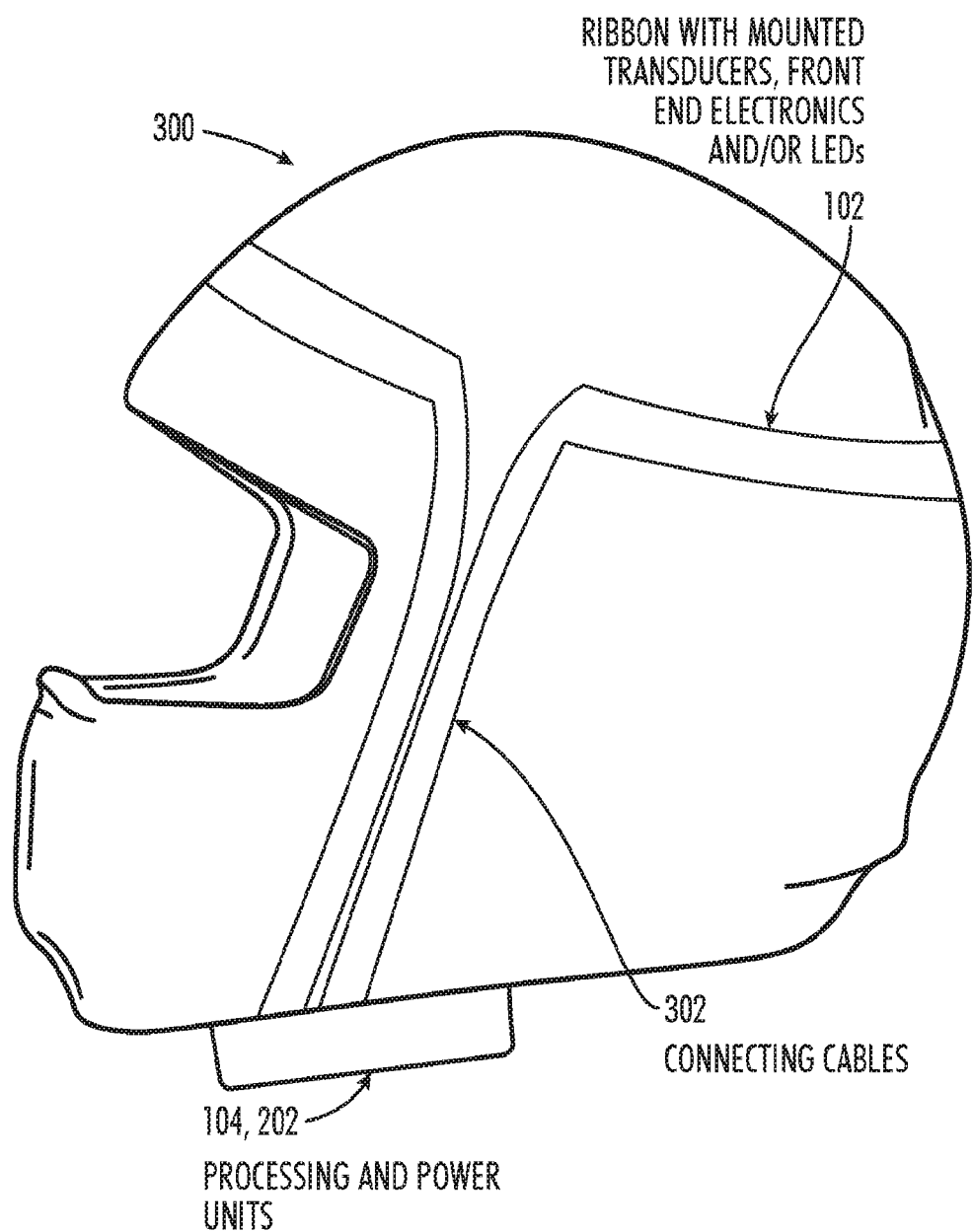
FIG. 3 is a schematic view of a helmet of an audio enhanced perception system, in accordance with an exemplary embodiment of the invention.

FIG. 3 shows a schematic view of a helmet 300 of an audio enhanced perception system 100, in accordance with an exemplary embodiment of the invention. In an embodiment of the invention, the human audio field is exploited to augment the visual field and provide up to a 360° combined FOV in a warning system. Motorcycle applications provide a unique set of conditions for implementing a collision warning system. Such conditions include the already overtaxed visual input experienced by the vehicle operator, the driving pattern of motorcyclists (especially in states and countries where lane splitting is legal), the limited field of view on the sides and rear of the vehicle, the high ambient noise drowning out any audible warnings present in the audio field (wind noise, motorcycle engine noise, horns, engine noise of on-coming vehicles, etc . . . ), the common use of ear plugs to protect the rider's hearing from high ambient noise (and important environmental noises that could provide a warning to the rider regarding an impending situation requiring evasive action) and the high risk of injury or death to motorcyclists in the case of a collision.

In an embodiment of the invention, the system 100 provides the motorcyclist with an augmented, spatially resolved, audio display containing information on the direction of the surround vehicles with vehicle distance, size, trajectory and/or relative velocity being represented by a sound regime as similar to human experience as possible, wherein larger vehicles take up a larger part of the audio FOV at a particular distance, closer vehicles have a higher amplitude, approaching vehicles have a higher frequency and exiting vehicles having a lower frequency depending on their relative velocity.

FIGS. 4A-4H show representative views of an audio enhanced perception system 100 in various operative scenarios (mounted in a motorcyclist's helmet 300 and/or on the motorcycle 402 itself), such as just described and/or in accordance with an exemplary embodiment of the invention.

Figure 4A:
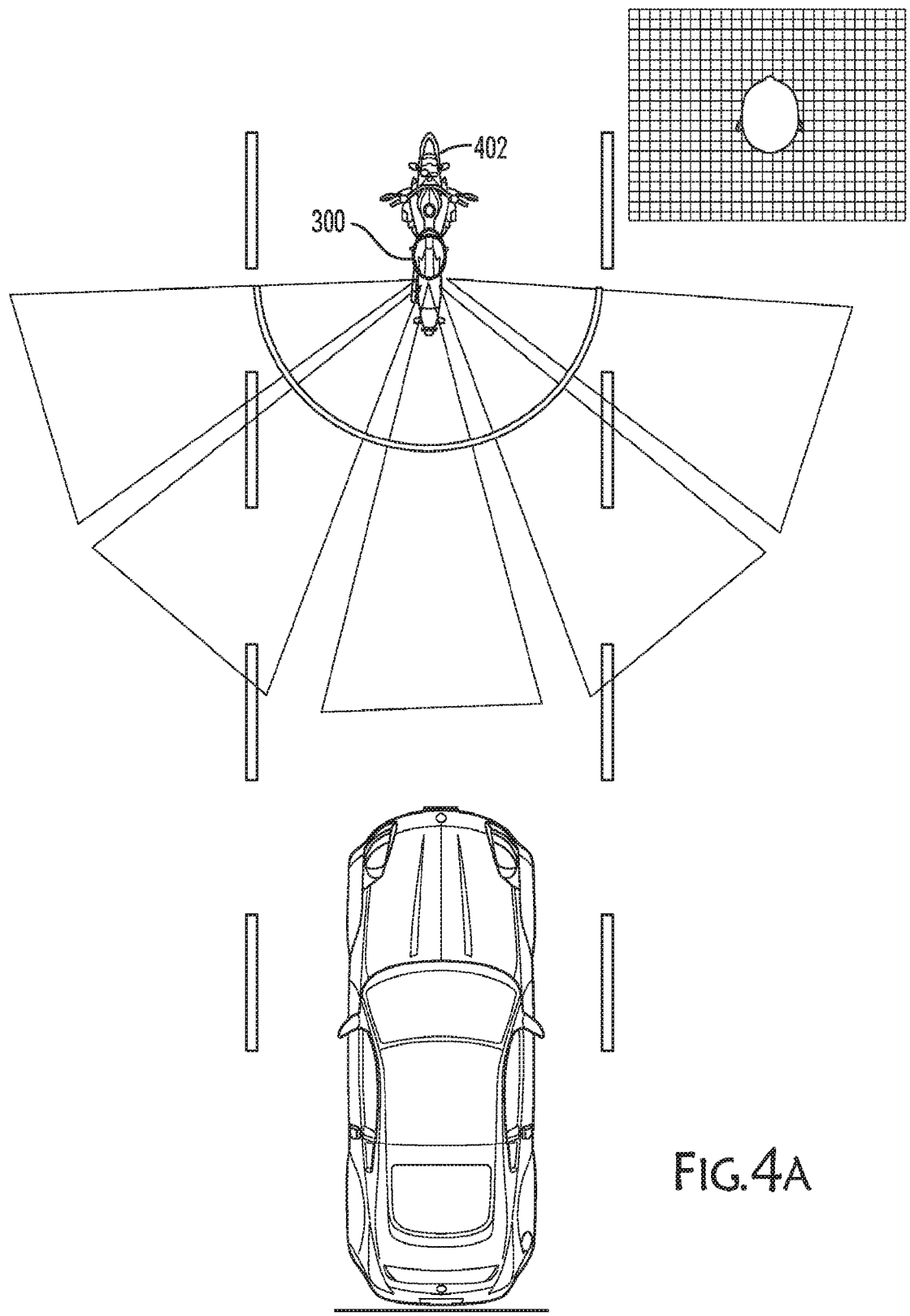
FIGS. 4A-4H are representative views of an audio enhanced perception system in various operative scenarios, in accordance with an exemplary embodiment of the invention.

FIG. 4A shows an exemplary operative scenario where no objects or vehicles are within system 100 range, and thus there is no synthesized/processed auditory scene or display created for the user.

Figure 4B:
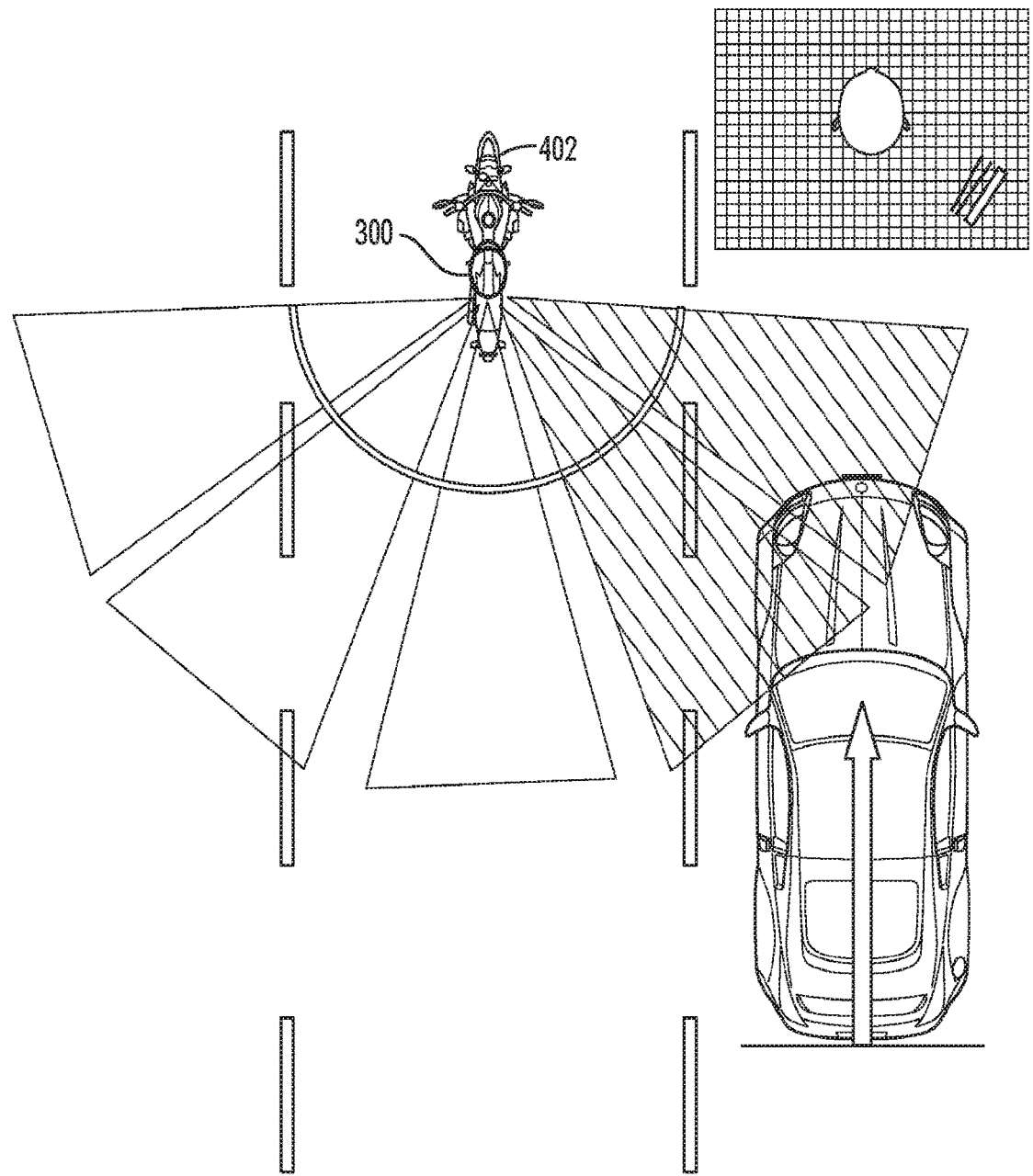

FIG. 4B shows an exemplary operative scenario where an incoming vehicle, with a relative trajectory depicted by the direction and length of the arrow, is detected by system 100 in the right lane (relative to the user). The auditory display is synthesized to provide information on the size, trajectory and position of the incoming vehicle.

Figure 4C:
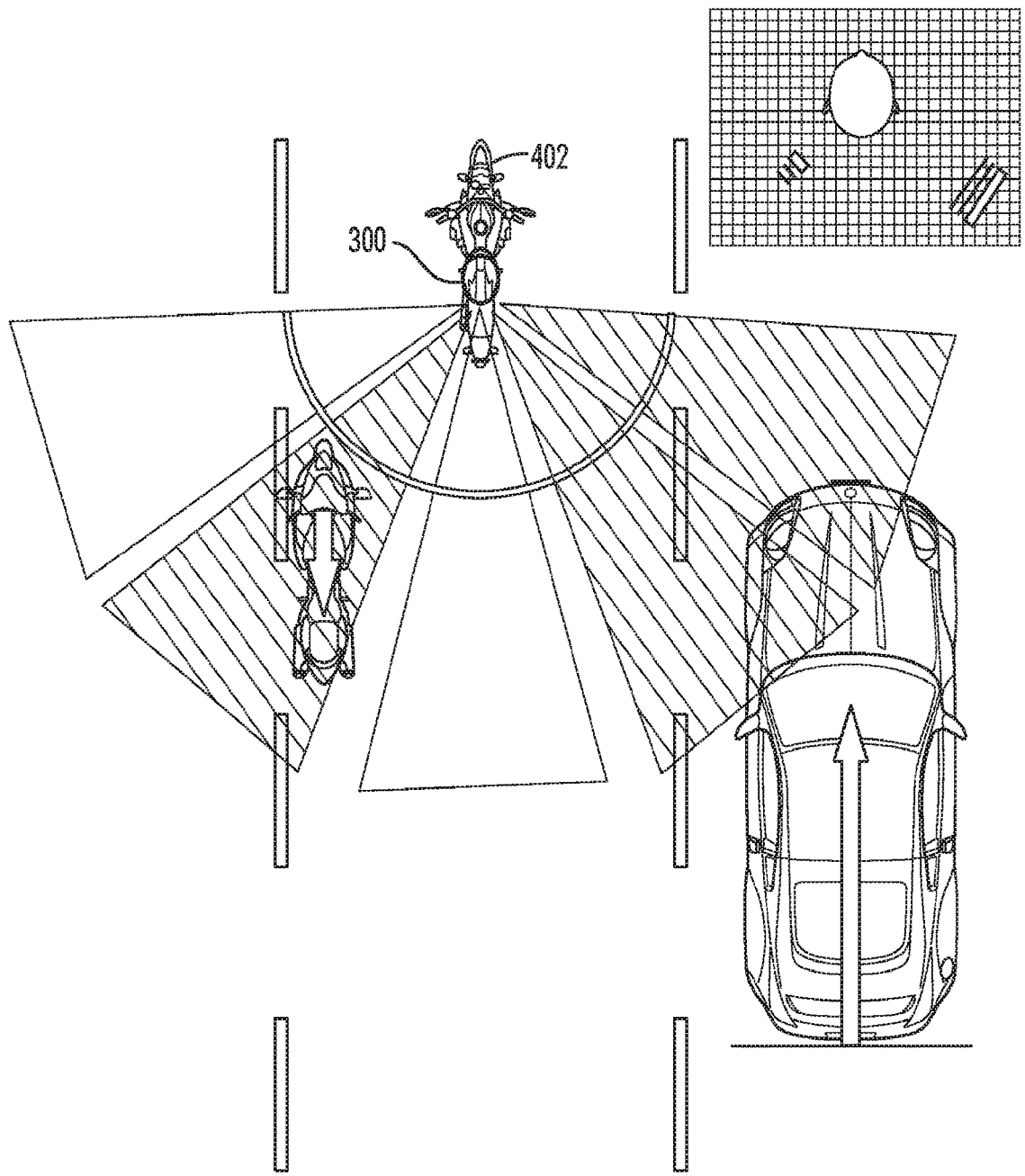

FIG. 4C shows an exemplary operative scenario where an incoming vehicle is detected by the system 100 in the right lane and outgoing smaller vehicle is detected to the left. In an exemplary embodiment of the invention, the auditory display is synthesized to provide information on the size, trajectory and position of both the incoming and outgoing vehicle simultaneously.

Figure 4D:
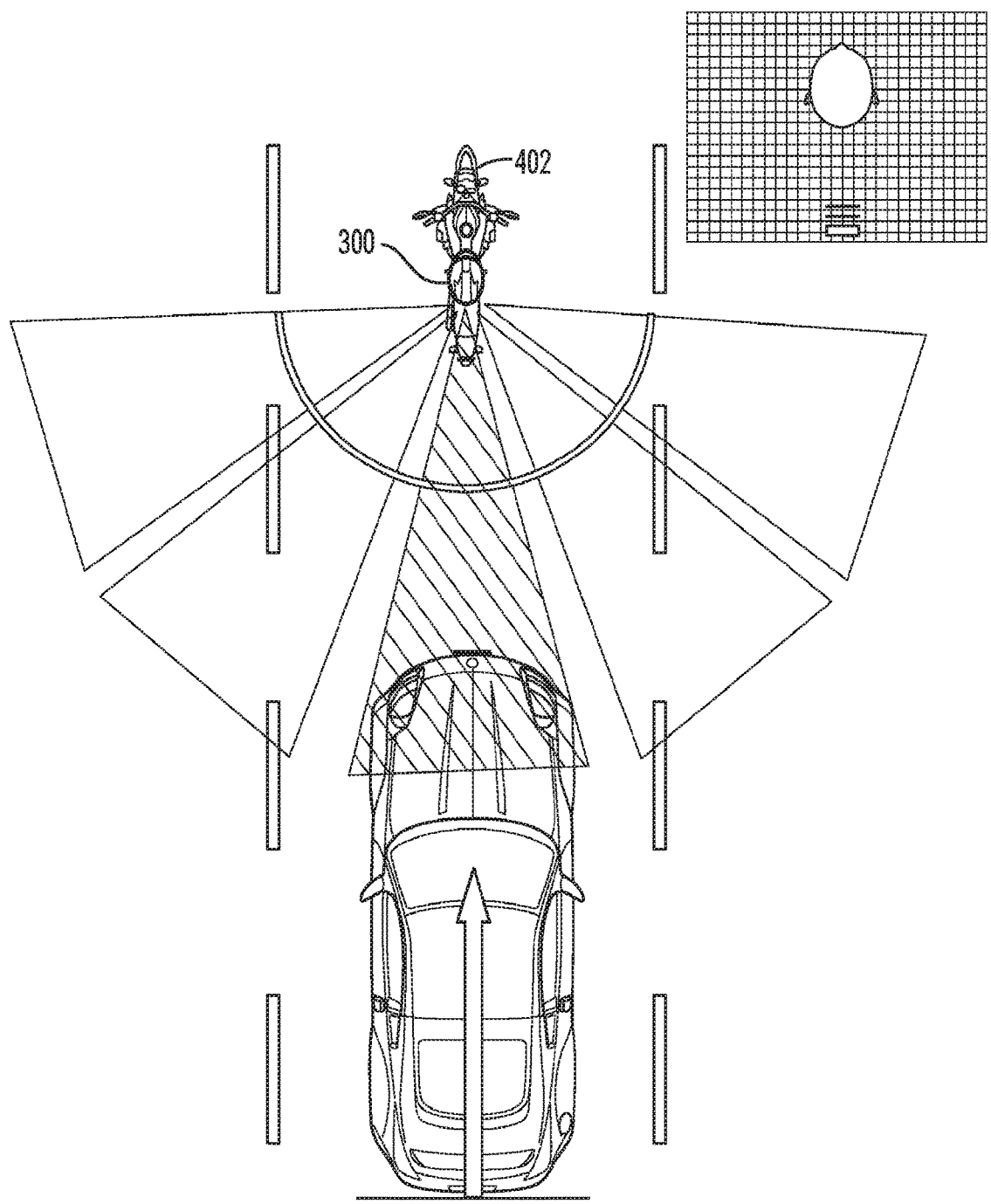

FIG. 4D shows an exemplary operative scenario where an incoming passenger vehicle is detected by the system 100 directly behind the operator/user. In an exemplary embodiment of the invention, the auditory display is synthesized to provide information on the size, trajectory and position of the incoming vehicle.

Figure 4E:
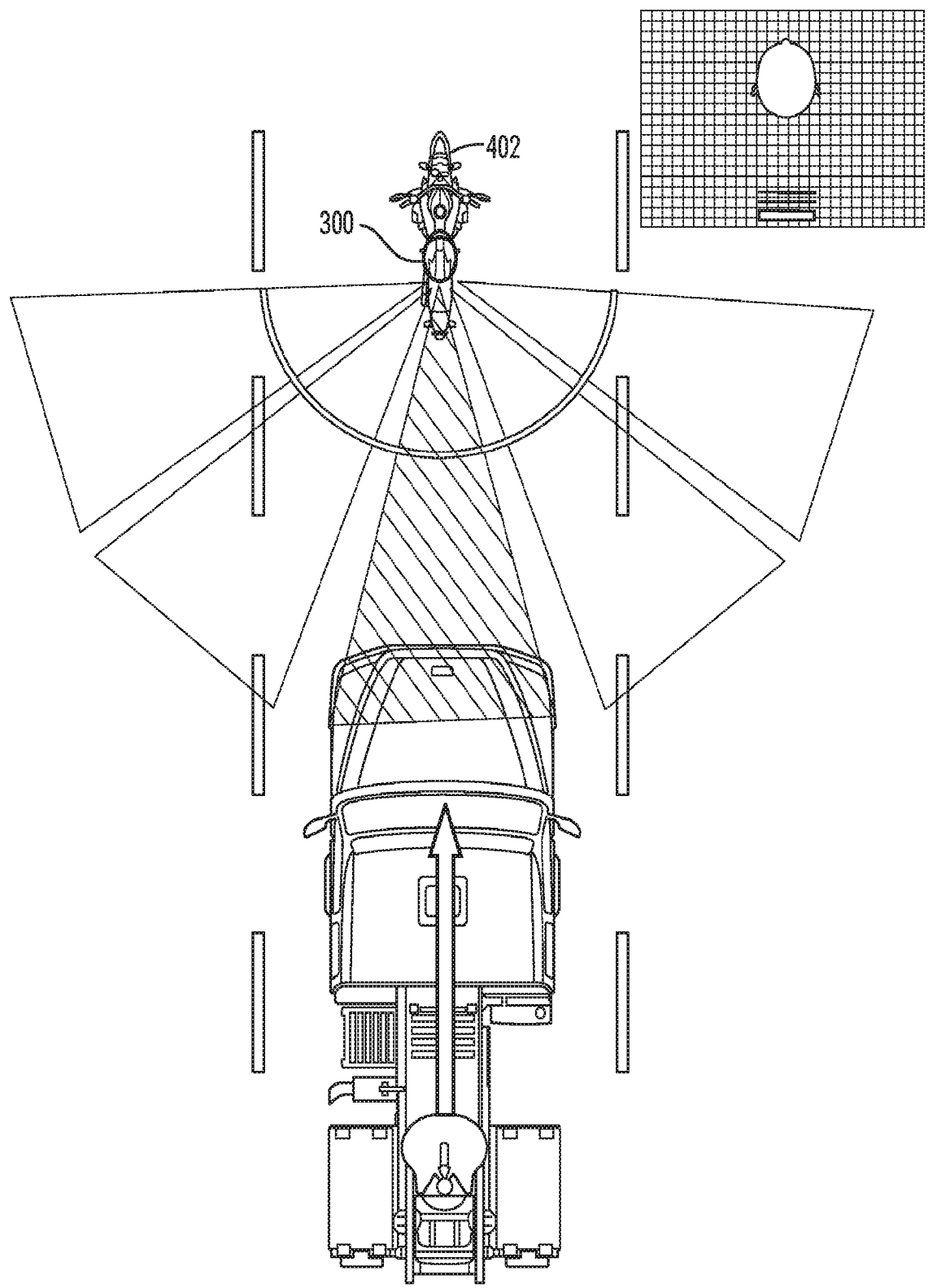

FIG. 4E shows an exemplary operative scenario where an incoming truck is detected by the system 100 directly behind the operator/user. In an exemplary embodiment of the invention, the auditory display is synthesized to provide a larger acoustic signature (when compared to the acoustic signature of the car in FIG. 4D), in addition to the trajectory and position of the incoming truck.

Figure 4F:
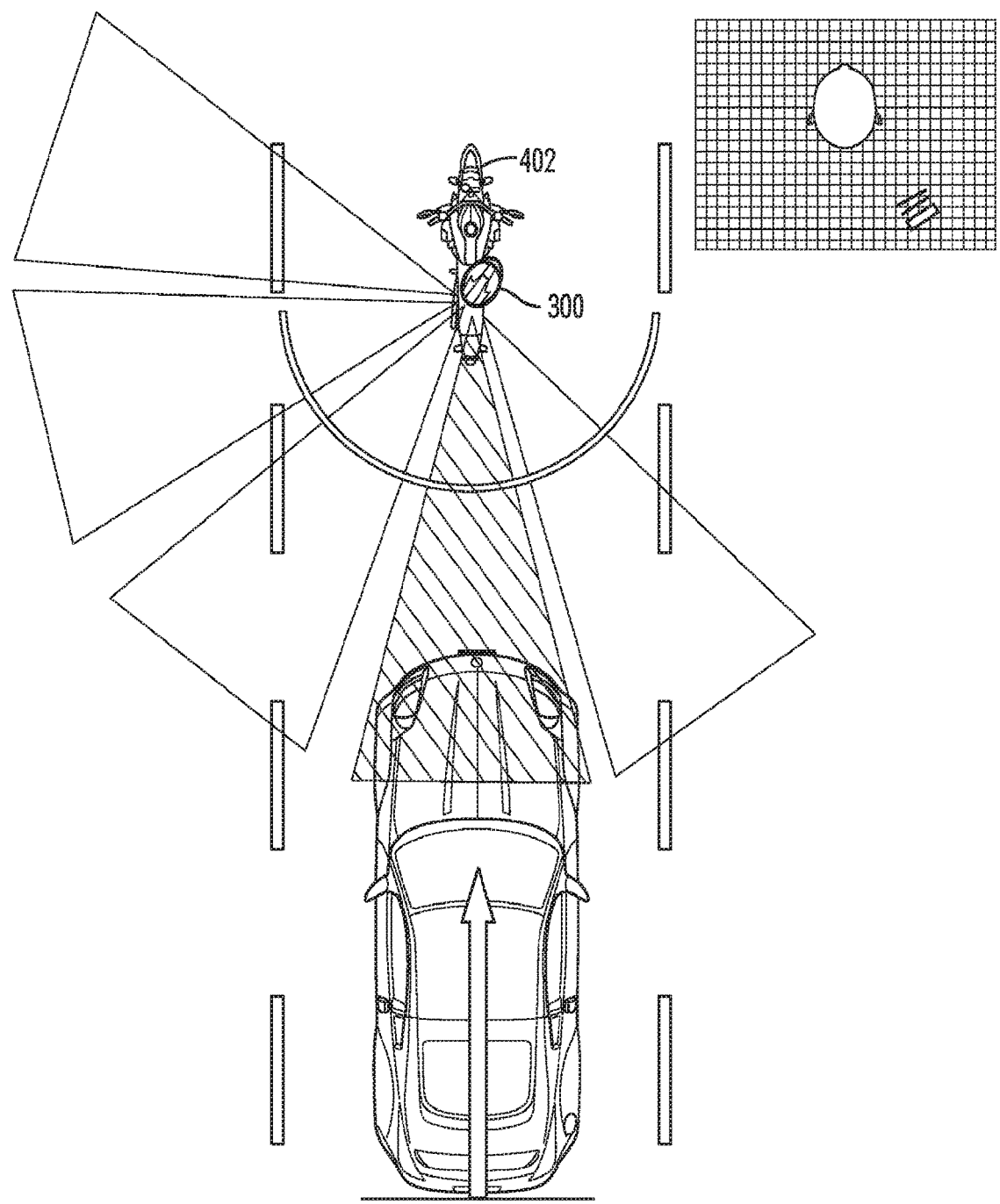

FIG. 4F shows an exemplary operative scenario where an incoming passenger vehicle is detected by the system directly behind the operator while the operator's head is turned to the right. In an exemplary embodiment of the invention, the auditory display is synthesized in a similar fashion to our natural hearing and the orientation is maintained relative to the position of the operator's head. Detection of head/helmet orientation is described elsewhere herein.

Figure 4G:
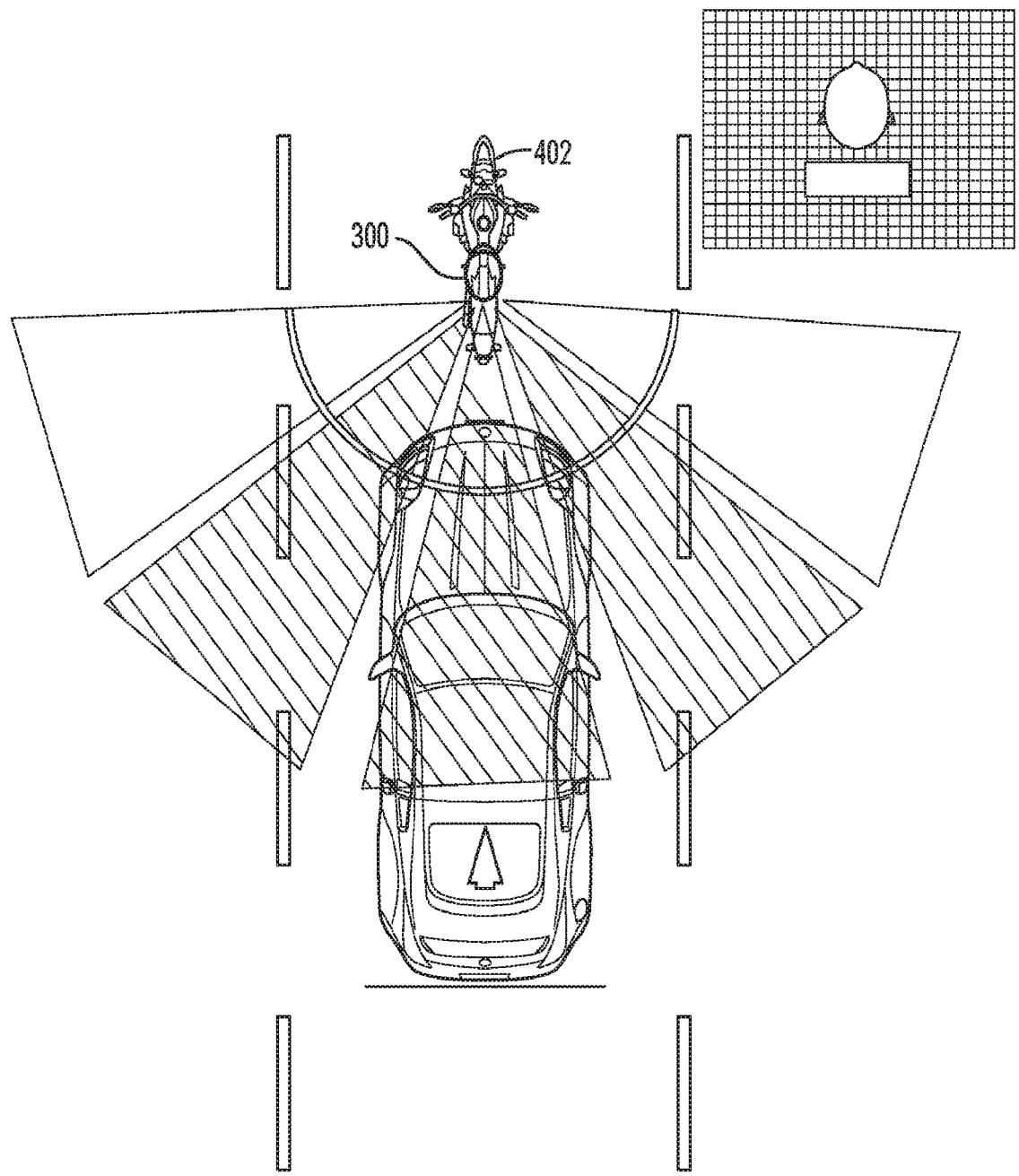

FIG. 4G shows an exemplary operative scenario where a passenger vehicle is detected by the system 100 in close proximity (within a predetermined distance depicted by the arc behind the operator's vehicle) directly behind the operator. In an exemplary embodiment of the invention, the auditory display is synthesized to warn the operator of the breach of the proximity perimeter and the related enhanced danger.

Figure 4H:
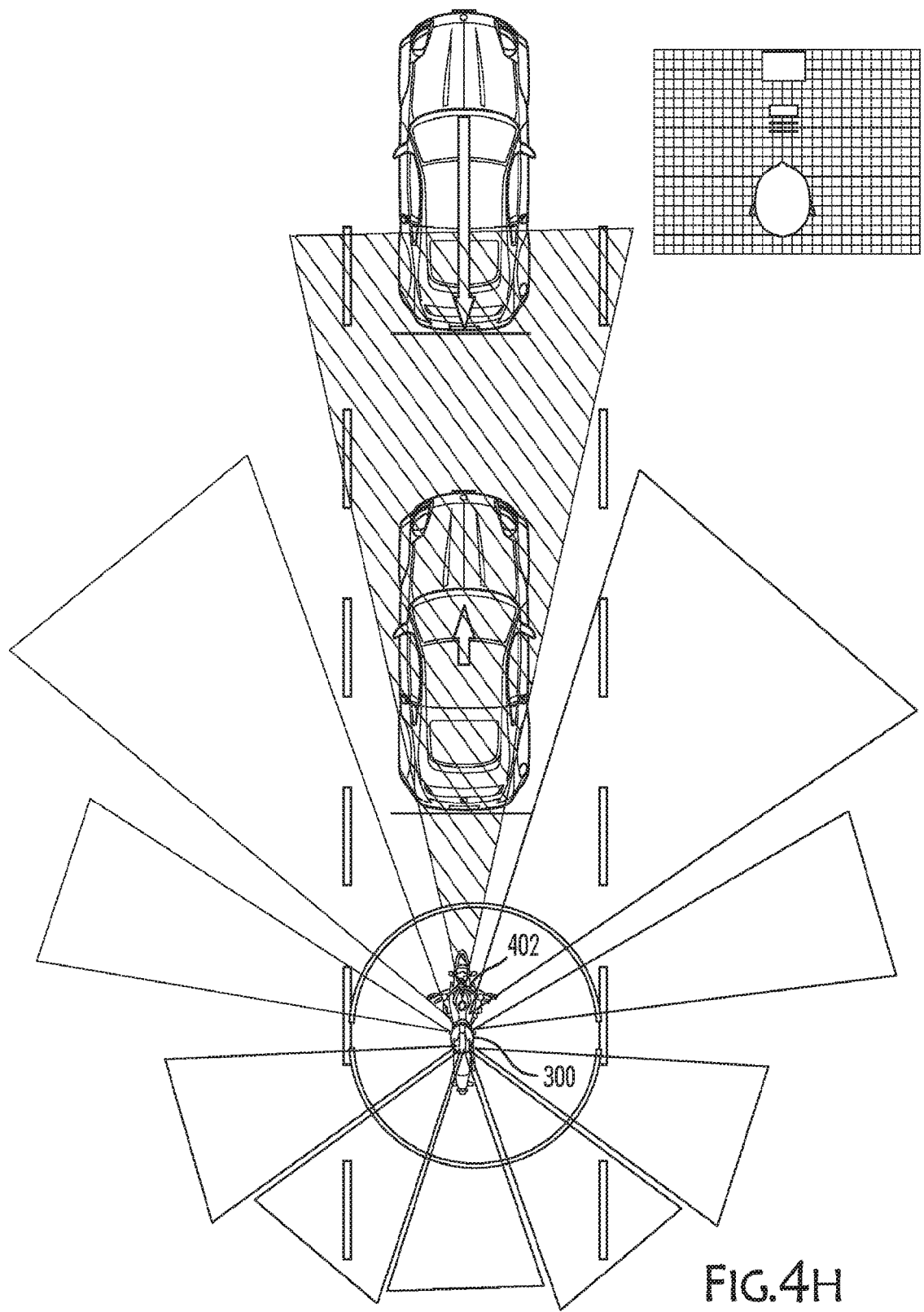

FIG. 4H shows an exemplary operative scenario where two vehicles are in the same lane and in front of the operator. In this scenario, the first vehicle performs an emergency stop and the second vehicle continues forward. In an exemplary embodiment of the invention, the auditory display is synthesized to include a warning signal for the first vehicle (showing a rearward pointing arrow) in conjunction with the information on the second (provided the second vehicle does not entirely obscure the signal from the first vehicle).

The system 100 can be designed into the motorcyclist's helmet 300 by the helmet manufacturer or may be added on as an aftermarket package. The user may, however, modify aspects of the representation of the distance and/or relative velocity of the vehicle to adhere to the riding style of that particular motorcyclist and/or set up alarms for particularly dangerous situations. This configuration would obviate the primary cause for alarm fatigue while providing the motorcyclist the most information on the environment outside of their visual field in an extremely intuitive and non-distracting manner.

An additional advantage to a helmet mounted augmented audio system, such as the one discussed herein, is the inherent fixed orientation between the position of the human head in the helmet and the feedback from the system without a need for providing any external orientation mechanism. This provides the operator with a very intuitive, real life, understanding of the audio field being provided since the data is in the same orientation as would be provided by normal hearing in situations when the head orientation changes. The system can automatically be switched on and off when the user places their head in or out of the helmet respectively. The system is motorcycle independent and can be transferred for use from one motorcycle to another.

Figure 8:
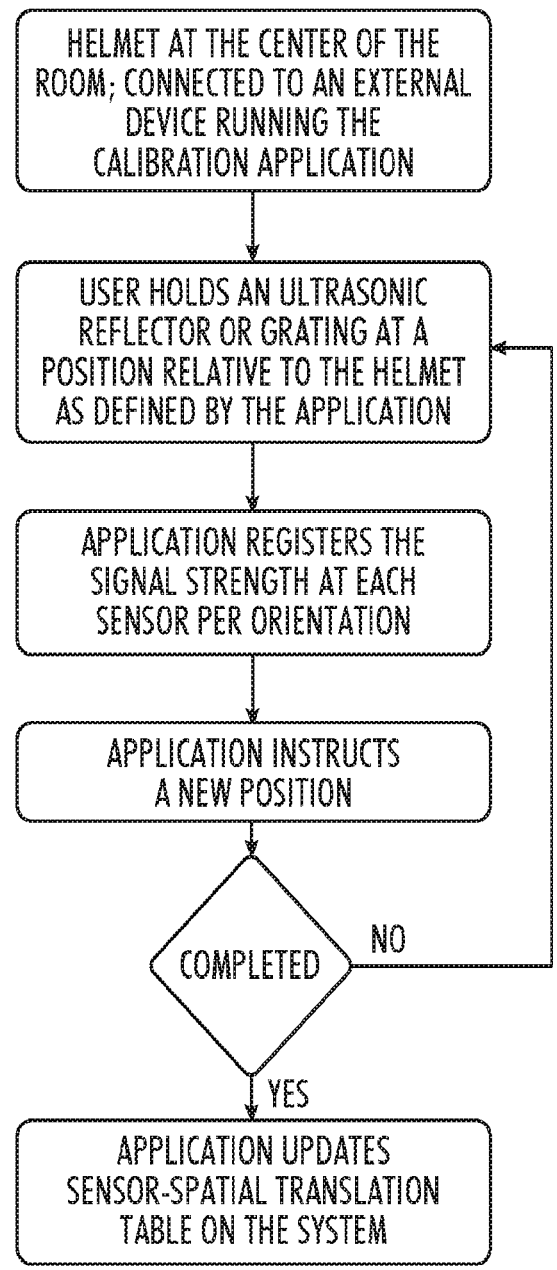
FIG. 8 is a flowchart of a method of calibrating an audio enhanced perception system, in accordance with an exemplary embodiment of the invention.

The system can be connected for charging of the battery and/or communication with an external device for configuring the system, for example with a USB cable or the like. With the aid of a custom application running on the external device, the user may modify aspects of the representation of the distance and relative velocity of the vehicle to adhere to the riding style of that particular motorcyclist and/or set up alarms for particularly dangerous situations. Through the custom application, the user may also perform a calibration procedure to ensure the spatial accuracy of the sensor array field. In an embodiment of the invention, such a procedure would entail the user being instructed by the application to hold a reflector/grating provided with the system at different positions with respect to the helmet, after successfully performing the procedure, the application would then allow for an update of the spatial correlation table (a table containing the spatial orientation of each sensor with respect to the helmet). FIG. 8 is a flowchart of a method of calibrating an audio enhanced perception system, in accordance with an exemplary embodiment of the invention.

In some embodiments of the invention, the system is charged and/or powered using some form of electricity generating component, such as a motorcycle's power output plug (usually a 12V plug) and/or photovoltaic cells and/or turbines and/or through wind power, etc.

In an embodiment of the invention, the sensing unit 102 is mounted on the outside of the helmet. The sensing unit 102 is connected by either cable 302 or wireless protocol that can ensure real-time, mission critical data transfer to the processing unit. The sensing unit 102 comprises ultrasonic ranging sensors, such as the Hexamite HX25TR sensor, mounted in a configuration so as to provide a contiguous FOV between 180° and 300°. In the case of the HX25TR sensor, it would be possible to provide angular coverage of ±23° and a range of 50 meters from each statically mounted sensor on the helmet. In some embodiments of the invention, the sensor provides enough vertical coverage to compensate for changes in the position of the helmet in different riding positions. The sensing unit 102 is optionally manufactured as a PCB (Printed Circuit Board) ribbon similar to LED ribbons with the control unit and ultrasound transducer embedded in the ribbon, in some embodiments of the invention, this is incorporated into an aftermarket package.

In an embodiment of the invention, the ribbon implementation allows for a low profile, flexible device that will have minimal effect on the aerodynamics and other functionality of the helmet while allowing for easy installation on a large range of helmet shapes and sizes. The ribbon will be weatherproofed in a manner that will not interfere with the functionality of the sensors such as the use of heat shrinks and/or silicone and/or other weatherproofing materials. The ribbon will be provided with an adhesive to be attached to the exterior of the helmet, in an embodiment of the invention. Guidelines are optionally given to the user for the mounting positions for different helmets. If the helmet exists in the database and the guidelines are followed the user can use a factory provided calibration dataset to provide the spatial distribution of the sensor array field, in an embodiment of the invention. If not, the user can optionally perform a calibration of the device, as discussed herein.

The processing unit 104 could be either a dedicated unit located on or off-board the helmet or a software application running on an off-board, general processing platform (such as a smartphone, tablet, etc. . . . ). In an embodiment of the invention the processing unit provides real-time, mission critical computational resources and/or can incorporate other audio and/or data input elements such as a GPS, telephone, etc. . . The processing unit 104 is optionally connected to the helmet-mounted audio interface unit by either a cable or wireless protocol that can ensure real-time, mission critical data transfer. In an embodiment of the invention the processing unit 104 is connected to an external device (such as a smartphone, tablet, etc. . . . ) running a dedicated application to provide a user interface for operating the system.

In an embodiment of the invention, the audio interface unit 106 has audio drivers in either a stereo or multichannel configuration at each ear or a bone-conducting headset that would allow for the motorcyclist to continue using ear plugs for ambient noise isolation while not sacrificing the environmental perception provided by the augmented audio system. The audio interface unit 106 also optionally provides adequate ambient noise isolation or measurement and/or compensation to ensure that the user will accurately distinguish the synthesized augmented audio data from the ambient noise.

In an embodiment where knowledge of the orientation between the helmet and the motorcycle is desirable, an ultrasonic grating or reflector can be mounted at the rear or front of the motorcycle which provides a unique ultrasonic pattern that can be easily differentiated by the system from the background and can be used as a spatial-acoustic anchor. Alternatively, additionally and/or optionally, the direction of the largest Doppler shift of the background signal can be analyzed to extract the direction of the forward moving direction of the vehicle which additionally and/or optionally can be correlated with speed data from the GPS to verify the signal used for orientation indeed contains the correct Doppler frequency.

Figure 9:
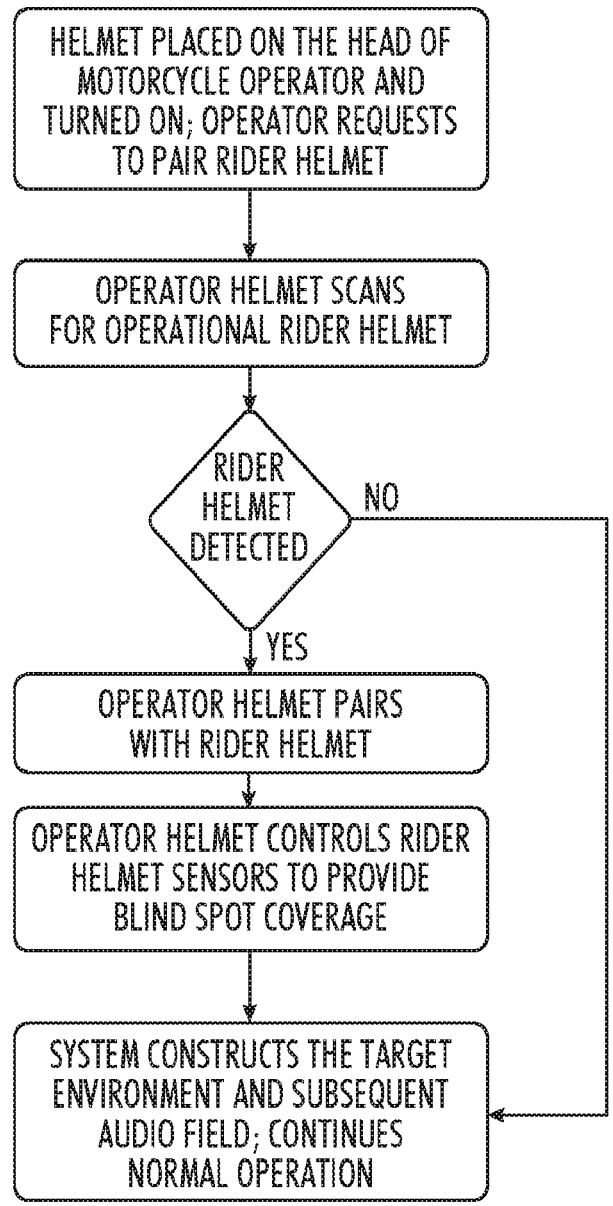
FIG. 9 is a flowchart of a method of using a plurality of user systems to enhance the performance of at least one audio enhanced perception system, in accordance with an exemplary embodiment of the invention.

It would also be possible to exploit the system for inter-rider communication by using the ultrasonic transducers as transponders and implementation of a communication protocol for audio information via an ultrasonic channel between the transducers located on the helmets of two separate riders. FIG. 9 is a flowchart of a method of using a plurality of user systems to enhance the performance of at least one audio enhanced perception system, in accordance with an exemplary embodiment of the invention. This may be also used in a two-up configuration where there is a rider behind the motorcycle operator. This situation would normally block the rear facing sensors from the surrounding environment and cause a blind spot in the audio field. In an embodiment of the invention, the rider's helmet has a mounted system that can communicate with the operator's helmet either by a communication protocol implemented over an ultrasonic channel, RF wireless communication or other communication protocol. In the case of an ultrasonic channel, the some or all of the transducers can be optionally used as transponders. The data acquired by the rider's helmet can be transferred by the transducers facing the operator's helmet, while the transducers facing the rider on the operator's helmet will receive the information to provide additional FOV information that can be integrated into the operator's audio field, in some embodiments of the invention.

Additional Exemplary Embodiments

Bicycle Helmet for Road Cyclists

In some embodiments of the invention, the system 100 is configured to save weight and/or power expenditure, for example, in a bicycle helmet embodiment where less hardware is used. In an embodiment of the invention, the sensing unit 102 may be mounted on the cyclist's helmet or alternatively and/or optionally on the bicycle itself. In some embodiments of the invention, only information from the rear of the bicycle is presented to the cyclist since it is understood by the cyclist that most threats to the cyclist emanate from the rear. The limited threat angle and lower weight requirement allows for implementation of a simpler system than the system described for motorcycle use above, however the underlying system operating principles remain the same. The system may be integrated with other Bluetooth audio headsets or a dedicated headset provided with the system.

The Reduced FOV with reduced # of sensors are configured to alert the cyclist to fast approaching vehicles from the rear of the bicycle at a distance that would allow for sufficient time for evasive action on the part of the bicyclist. In addition, the driver of the oncoming vehicle to a potential collision with the bicycle is alerted, in an embodiment of the invention. The EVNU 108 optionally comprises a simple integrated lighting and audio system that could effectively acquire the attention of the driver of the oncoming vehicle which may assist in avoiding the collision. In an embodiment of the invention, a rear facing directional audible horn and LED lighting system that would be triggered in threatening situations provides both audio and visual stimulus for the notification of the driver that a collision may occur if the current course is maintained.

Cabin-based Operator

Figure 10:
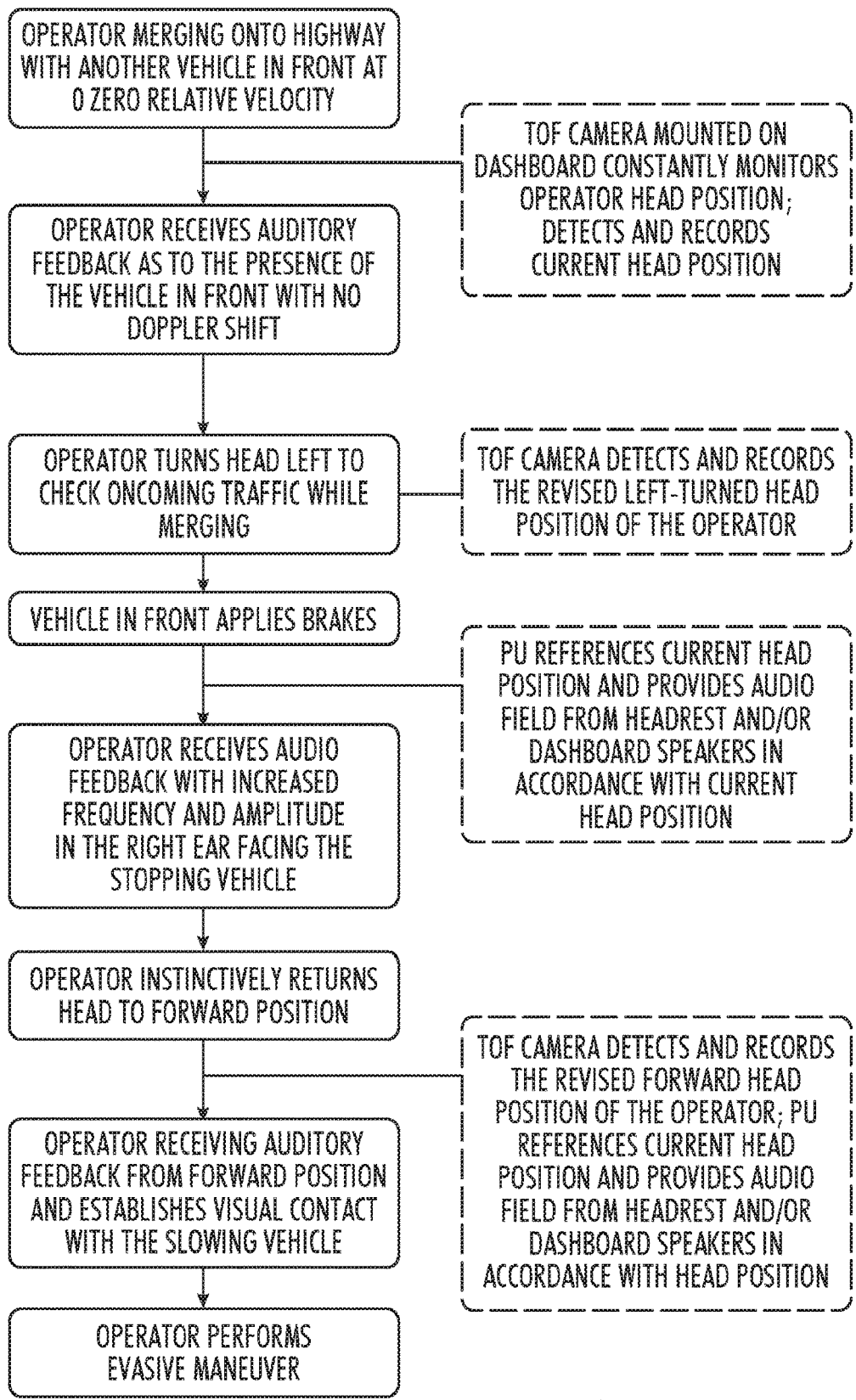
FIG. 10 is a flowchart of a method of enhancing a cabin-based vehicle operator's awareness, in accordance with an exemplary embodiment of the invention; and, FIG. 11 is a flowchart of a method of notifying at least one other vehicle, in accordance with an exemplary embodiment of the invention.

Another example of an application specific audio transmission system, in an embodiment of the invention, would be in the case of a driver located in the cabin of a vehicle and the SU 102 is mounted on the outside of the vehicle. In this embodiment, optionally, the operator's head will be tracked to provide angular orientation between the audio display and the operator's head. The tracking can be done by a single or plurality of Time of Flight and/or optical cameras mounted on the dashboard of the vehicle, connected to the PU 104 and optionally integrated with the audio interface unit 106. FIG. 10 is a flowchart of a method of enhancing a cabin-based vehicle operator's awareness, in accordance with an exemplary embodiment of the invention.

Generally, the cabin of a vehicle is designed to isolate the noise outside of the vehicle from the cabin thereby creating a quiet environment. In addition, most vehicles have an installed audio system with multiple speakers usually placed in the front, sides and rear of the vehicle.

In an embodiment of the invention, a multi-channel surround sound system is provided where the audio interface unit 106 of the warning system is located between the stereo system output and the speakers. Under normal conditions, the audio interface unit 106 would remain idle or act as a relay for the stereo signal to the speakers. In the case of a warning, the audio interface unit would synthesize the warning and overlay it onto the existing signal. Since, in an embodiment of the invention, all speakers will be connected to the audio interface unit 106 separately, the unit will then activate the speakers to provide the spatially resolved environmental information, as well as reduce the volume of all speakers to accentuate the effect on the driver. This system would efficiently make use of existing infrastructure in the vehicle, however in an embodiment of the invention all occupants of the cabin will be exposed to the transmitted warning signals.

An embodiment of the invention includes a set of audio drivers into the headrest of the driver that would work identically to surround sound headphones and would be transmitted specifically to the driver of the vehicle. Alternatively, a two channel crosstalk cancellation technique may be implemented through audio drivers mounted on the dashboard. In this case, the generated audio signal is transmitted in such a manner that at a particular location in front of the speakers the acoustic signals of the unwanted crosstalk from each speaker will cancel at the opposite ear. Other passengers in the cabin will not experience the surround effect since they will be outside the sweet spot generated by the cancellation technique. Alternatively, additionally, and/or optionally, bone conducting headphones maybe advantageous since it would allow the system to transmit the environmental information without interfering with the ability to perceive other sounds in the cabin (conversations, music, telephone conversations, etc . . . ). Alternatively, additionally and/or optionally, the implementation of a super directional loudspeaker located on the dashboard of the vehicle will ensure the audio field information will be conveyed to the vehicle operator while minimizing the exposure to other vehicle occupants.

It would also be possible to exploit the system for inter-vehicle communication by using the existing ultrasonic transducers as transponders and implementation of a communication protocol for audio information via an ultrasonic channel between the transducers located on the outside of two separate vehicles.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

The invention claimed is:

1. A method for enhancing the environmental perception of a vehicle operator, the method comprising the steps of:
   detecting information relating to at least the position and dynamics of other vehicles or obstacles in the vicinity of the vehicle operator, with at least one head-mounted sensing unit worn by the vehicle operator;
   processing the detected information by a processing unit communicatively coupled with the sensing unit, to generate a spatial reconstruction of the vicinity of the vehicle operator; and
   providing the vehicle operator with a spatially resolved audio signal indicating the position and dynamics of other vehicles or obstacles in the vicinity, using an audio interface unit communicatively coupled with the processing unit.

2. A method according to claim 1, wherein the audio interface unit is configured to modify the frequency phase and the amplitude of the audio signal provided to each ear of the vehicle operator so as to simulate the arrival of sound waves from a particular direction in space.

3. A method according to claim 1, wherein the audio interface unit is configured to isolate or filter selected ambient noises in the provided spatially resolved audio signal.

4. A method according to claim 1, further comprising constantly updating the spatially resolved audio signal in real time based on the detected information.

5. A method according to claim 1, wherein the detected information includes at least one selected from the list consisting of: position, acceleration, distance, size, speed, orientation, direction, relative position, relative acceleration, relative distance, relative size, relative speed, relative orientation and relative direction, of at least one object or vehicle in the vicinity of the vehicle operator.

6. A method according to claim 1, wherein the step of detecting information is conducted using at least one sensor selected from the group consisting of: an optical camera; an omnidirectional camera; an ultrasound device; a laser range finder; a time of flight camera; a light field camera; a stereoscopic vision camera; an interferometry device; and a radar device.

7. A method according to claim 1, further comprising dynamically changing at least one of: the detecting, the processing; and the providing, based on at least one of: a detected global position of the vehicle operator cross-referenced with a map; and a vehicle operator field of view.

8. A method according to claim 1, further comprising the step of communicating with a second vehicle operator of a second vehicle to enhance at least one of: the detecting; the processing; and the providing, for the first vehicle operator.

9. A method according to claim 8, wherein a head-mounted sensing unit worn by the second vehicle operator provides detected information relating to at least the position and dynamics of other vehicles or obstacles in a blind spot of the head-mounted sensing unit worn by the first vehicle operator.

10. A method according to claim 1, further comprising at least one of the steps of:
   calibrating the sensing unit by sequentially positioning an ultrasonic reflector/grating at multiple positions relative to a helmet worn by the vehicle operator, registering a signal strength of each sensor of the sensing unit at each position of the reflector/grating, and updating a spatial correlation table containing the spatial orientation of each sensor with respect to the helmet; and
   detecting an orientation of a helmet worn by the vehicle operator in relation to the vehicle, by using an ultrasonic reflector/grating within the vehicle as a spatial-acoustic anchor.

11. A method according to claim 1, further comprising the step of providing a directional visual or audio notification to at least one other vehicle in the vicinity of the vehicle operator, using an extra vehicular notification unit, wherein the extra vehicular notification unit is configured with at least one rule of operation based on at least one selected from the group consisting of: GPS information for determining vehicle location, velocity and trajectory relative to traffic, and traffic information acquired through a global communications network.

12. A method according to claim 1, wherein the processing comprises using Doppler shift of signals received from the sensing unit to determine a relative speed between the sensing unit and surrounding objects.

13. A method according to claim 1, wherein the sensing unit is in a fixed orientation with respect to the head of the vehicle operator, thereby maintaining a constant known orientation for providing feedback to the vehicle operator.

14. A method according to claim 1, further comprising the step of detecting the orientation of the head of the vehicle operator, and providing the spatially resolved audio signal based on the detected head orientation.

15. A method according to claim 1, wherein the spatially resolved audio signal provides information on the direction and dynamics of the other vehicles in the vicinity, whereby larger vehicles take up a larger part of the audio FOV at a particular distance, closer vehicles have a higher amplitude, approaching vehicles have a higher frequency, and exiting vehicles have a lower frequency depending on the relative velocity thereof.

16. A method according to claim 1, wherein the vehicle operator is located in the cabin of a vehicle, and wherein the head orientation of the vehicle operator is tracked using cameras, and the audio signal is provided based on the head orientation.

17. A system for enhancing the environmental perception of a vehicle operator, the system comprising:
   at least one head-mounted sensing unit, worn by the vehicle operator, the sensing unit configured to detect information relating to at least the position and dynamics of other vehicles or obstacles in the vicinity of the vehicle operator;
   at least one processing unit, communicatively coupled with the sensing unit, the processing unit configured to process the detected information to generate a spatial reconstruction of the vicinity of the vehicle operator; and, at least one audio interface unit, communicatively coupled with the processing unit, the audio interface unit configured to provide the vehicle operator with a spatially resolved audio signal indicating the position and dynamics of other vehicles or obstacles in the vicinity.

18. A system according to claim 17, where the sensing unit comprises at least one sensor selected from the group consisting of: an optical camera; an omnidirectional camera; an ultrasound device; a laser range finder; a time of flight camera; a light field camera; a stereoscopic vision camera; an interferometry device; and a radar device.

19. A system according to claim 17, further comprising at least one head-mounted sensing unit worn by a second vehicle operator of a second vehicle, the head-mounted sensing unit worn by the second vehicle operator configured to detect information relating to at least the position and dynamics of other vehicles or obstacles in a blind spot of the head-mounted sensing unit worn by the first vehicle operator.

20. A system according to claim 17, wherein the head-mounted sensing unit is configured to detect information relating to a plurality of vehicles or obstacles in a plurality of directions and distances relative to the vehicle operator.

21. A system according to claim 17, wherein the head-mounted sensing unit is configured to detect the orientation of the head of the vehicle operator, and wherein the audio interface unit provides the audio signal based on the detected head orientation.

22. A system according to claim 17, further comprising an extra vehicular notification unit configured to provide a directional visual or audio notification to at least one other vehicle in the vicinity of the vehicle operator, wherein the extra vehicular notification unit is configured with at least one rule of operation based on at least one selected from the group consisting of: GPS information for determining vehicle location, velocity and trajectory relative to traffic, and traffic information acquired through a global communications network.

* * * * *